US009296905B2

(12) United States Patent
Pokorny et al.

(10) Patent No.: US 9,296,905 B2
(45) Date of Patent: *Mar. 29, 2016

(54) COATING COMPOSITIONS COMPRISING NON-IONIC SURFACTANT EXHIBITING REDUCED FINGERPRINT VISIBILITY

(71) Applicant: 3M INNOVATIVE PROPERTIES COMPANY, St. Paul, MN (US)

(72) Inventors: Richard J. Pokorny, Maplewood, MN (US); Thomas P. Klun, Lakeland, MN (US); Christopher B. Walker, Jr., St. Paul, MN (US); David B. Olson, Marine on St. Croix, MN (US); Joan M. Noyola, Maplewood, MN (US); Michelle L. Toy, North St. Paul, MN (US); Evan L. Schwartz, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 39 days.

This patent is subject to a terminal disclaimer.

(21) Appl. No.: 14/228,656

(22) Filed: Mar. 28, 2014

(65) Prior Publication Data
US 2014/0212651 A1 Jul. 31, 2014

Related U.S. Application Data

(63) Continuation of application No. 13/307,137, filed on Nov. 30, 2011, now Pat. No. 8,742,022.

(60) Provisional application No. 61/530,460, filed on Sep. 2, 2011, provisional application No. 61/486,000, filed on May 13, 2011, provisional application No. 61/424,768, filed on Dec. 20, 2010.

(51) Int. Cl.
*C08F 220/24* (2006.01)
*C09D 7/12* (2006.01)
*C08J 7/04* (2006.01)
*C09D 5/16* (2006.01)
*C08F 220/28* (2006.01)

(52) U.S. Cl.
CPC .............. *C09D 7/125* (2013.01); *C08F 220/24* (2013.01); *C08J 7/047* (2013.01); *C09D 5/1618* (2013.01); *C09D 7/1233* (2013.01); *C08F 2220/285* (2013.01); *Y10S 525/92* (2013.01); *Y10T 428/249953* (2015.04); *Y10T 428/31544* (2015.04); *Y10T 428/31663* (2015.04)

(58) Field of Classification Search
CPC ................ C09D 5/2628; C08F 220/24; C08F 2220/285; C08J 7/47
See application file for complete search history.

(56) References Cited

U.S. PATENT DOCUMENTS

| | | |
|---|---|---|
| 2,732,398 A | 1/1956 | Brice |
| 2,803,615 A | 8/1957 | Ahlbrecht |
| 3,159,662 A | 12/1964 | Ashby |
| 3,220,972 A | 11/1965 | Lamoreaux |
| 3,250,808 A | 5/1966 | Moore |
| 3,410,886 A | 11/1968 | Joy |
| 3,544,537 A | 12/1970 | Brace |
| 3,553,179 A | 1/1971 | Bartlett |
| 3,718,631 A | 2/1973 | Grosmangin |
| 4,013,615 A | 3/1977 | Ohashi |
| 4,262,072 A | 4/1981 | Wendling |
| 4,557,751 A | 12/1985 | Ronning |
| 4,609,574 A | 9/1986 | Keryk |
| 4,654,233 A | 3/1987 | Grant |
| 4,855,184 A | 8/1989 | Klun |
| 4,916,169 A | 4/1990 | Boardman |
| 5,145,886 A | 9/1992 | Oxman |
| 5,173,363 A | 12/1992 | Fitch |
| 5,178,871 A * | 1/1993 | Thill ............................ 424/405 |
| 5,581,905 A | 12/1996 | Huelsman |
| 5,648,407 A | 7/1997 | Goetz |

(Continued)

FOREIGN PATENT DOCUMENTS

| | | |
|---|---|---|
| EP | 1055718 | 11/2000 |
| EP | 1311637 | 4/2006 |

(Continued)

OTHER PUBLICATIONS

Griffin, "Calculation of HLB Values of Non-Ionic Surfactants", Journal of the Society of Cosmetic Chemists 5 (1954) 259.

(Continued)

*Primary Examiner* — Mark Kaucher
(74) *Attorney, Agent, or Firm* — Carolyn A. Fischer

(57) ABSTRACT

Presently described are coating compositions comprising a polymerizable resin composition and a non-ionic unpolymerizable surfactant. In some embodiments, the coating comprises greater than 10 wt-% of non-ionic unpolymerizable surfactant. In other embodiments, the coating composition comprises an an additive comprising a silicone group or a fluorinated group and a hydrophobic group. Also described are articles comprising the cured coating compositions. In one embodiment, an article is described comprising a cured coating wherein the cured coating exhibits a property of an initially visible simulated fingerprint reducing in visibility in 1-20 minutes. Also described is a method of determining the fingerprint visibility of a coating composition and a polyacylate composition useful as an additive. In another embodiment a coated surface is described comprising a polymeric organic material comprising a plurality of pores wherein a portion of the pores are interconnected and comprise a lipophilic liquid.

20 Claims, 3 Drawing Sheets

(56) References Cited

U.S. PATENT DOCUMENTS

| | | | |
|---|---|---|---|
| 5,677,050 | A | 10/1997 | Bilkadi |
| 5,694,701 | A | 12/1997 | Huelsman |
| 5,804,625 | A | 9/1998 | Temperante |
| 5,882,774 | A | 3/1999 | Jonza |
| 6,019,997 | A | 2/2000 | Scholz |
| 6,134,808 | A | 10/2000 | Yapel |
| 6,174,964 | B1 | 1/2001 | Jariwala |
| 6,224,949 | B1 | 5/2001 | Wright |
| 6,299,799 | B1 | 10/2001 | Craig |
| 6,368,699 | B1 | 4/2002 | Gilbert |
| 6,376,590 | B2 | 4/2002 | Kolb |
| 6,562,360 | B2 | 5/2003 | Scholz |
| 6,664,354 | B2 | 12/2003 | Savu |
| 6,995,222 | B2 | 2/2006 | Buckanin |
| 7,094,829 | B2 | 8/2006 | Audenaert |
| 7,153,563 | B2 | 12/2006 | Shoshi |
| 7,192,795 | B2 | 3/2007 | Boardman |
| 7,241,437 | B2 | 7/2007 | Davidson |
| 7,439,279 | B2 | 10/2008 | Kondo |
| 7,718,264 | B2 | 5/2010 | Klun |
| 8,138,275 | B2 | 3/2012 | Jung |
| 8,742,022 | B2 | 6/2014 | Pokorny |
| 2003/0012936 | A1 | 1/2003 | Draheim |
| 2003/0217806 | A1 | 11/2003 | Tait |
| 2004/0077775 | A1 | 4/2004 | Audenaert |
| 2004/0184150 | A1 | 9/2004 | Johnson |
| 2005/0137355 | A1 | 6/2005 | Buckanin |
| 2005/0142362 | A1 | 6/2005 | Inaoka |
| 2005/0147809 | A1 | 7/2005 | Hongo |
| 2005/0249940 | A1 | 11/2005 | Klun |
| 2005/0250921 | A1 | 11/2005 | Qiu |
| 2007/0149650 | A1 | 6/2007 | Masuda |
| 2008/0124555 | A1* | 5/2008 | Klun et al. .................. 428/421 |
| 2008/0160231 | A1 | 7/2008 | Newington |
| 2008/0292560 | A1 | 11/2008 | Tamarkin |
| 2010/0016452 | A1 | 1/2010 | Nedwed |
| 2010/0035053 | A1 | 2/2010 | Kishi |
| 2010/0160595 | A1 | 6/2010 | Klun |
| 2010/0173166 | A1 | 7/2010 | Dams |
| 2010/0296049 | A1 | 11/2010 | Justynska |
| 2012/0088090 | A1 | 4/2012 | Miyazaki |

FOREIGN PATENT DOCUMENTS

| | | |
|---|---|---|
| EP | 2042340 | 4/2009 |
| JP | 9-67417 | 3/1997 |
| JP | 2007-262286 | 10/2007 |
| JP | 2010-90235 | 4/2010 |
| JP | 2010-241987 | 10/2010 |
| JP | 2011-037263 | 10/2011 |
| KR | 2002-0054756 | 7/2002 |
| KR | 2004-0087534 | 10/2004 |
| KR | 10-2011-0031139 | 3/2011 |
| WO | WO 95/17303 | 6/1995 |
| WO | WO 99/39224 | 8/1999 |
| WO | WO 2006/102383 | 9/2006 |
| WO | WO 2008/067262 | 6/2008 |
| WO | WO 2009/029438 | 3/2009 |
| WO | WO 2009/076389 | 6/2009 |
| WO | WO 2009/090803 | 7/2009 |
| WO | WO 2009/148765 | 12/2009 |
| WO | WO 2011-034387 | 3/2011 |

OTHER PUBLICATIONS

Brunauer et al., "Adsorption of Gases in Multimolecular Layers", Contribution from the Bureau of Chemistry and Soils and George Washington University, Feb. 1938, pp. 309-319.
IUPAC Publication "Reporting Physisorption Data for Gas/Solid Systems with Special Reference to the Determination of Surface Area and Porosity", Pure & Applied Chemistry, vol. 57, No. 4, pp. 603-619, 1985.
Ferguson et al., "Preparation, characterization and use in emulsion polymerization of acrylated alkyl ethoxylate surface-active monomers", Polymer, 1993, vol. 34, No. 15, pp. 3281-3292.
Davies, "A Quantitative Kinetic Theory of Emulsion Type, I. Physical Chemistry of the Emulsifying Agent", University Lecturer in Chemical Engineering, Cambridge, pp. 426-438.
Partial International Search PCT/US2011/064606 (66971WO005) Mar. 26, 2012, 2 pgs.
International Search Report PCT/US2011/064606 (66971WO005), Jul. 6, 2012, 7 pages.
"Composition of Fingerprint Secretions", FIO Study Guides, undated, 4 pgs.

* cited by examiner

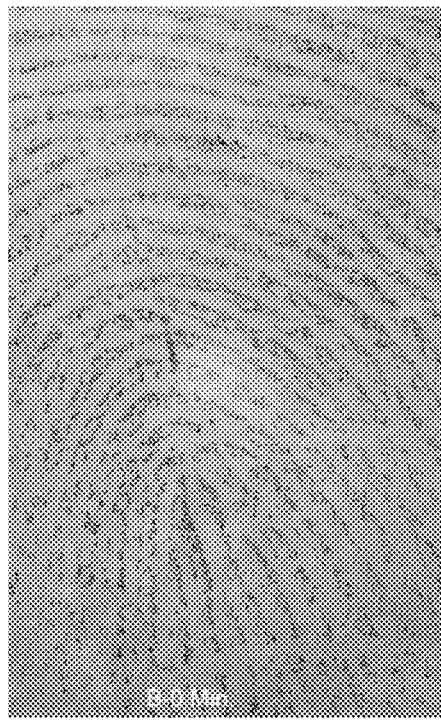 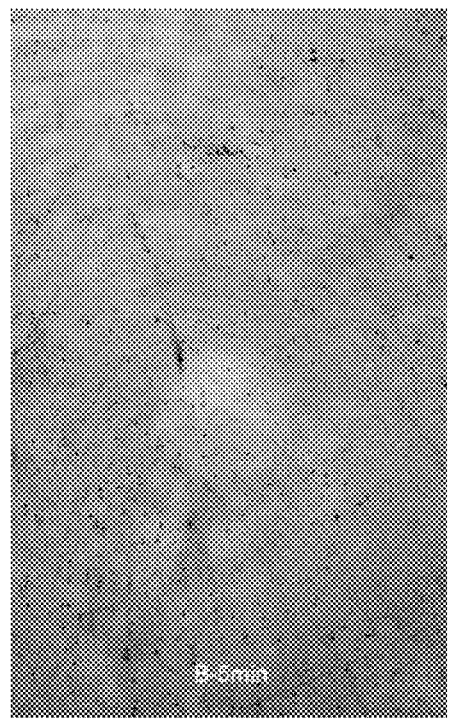
FIG. 1A          FIG. 1B
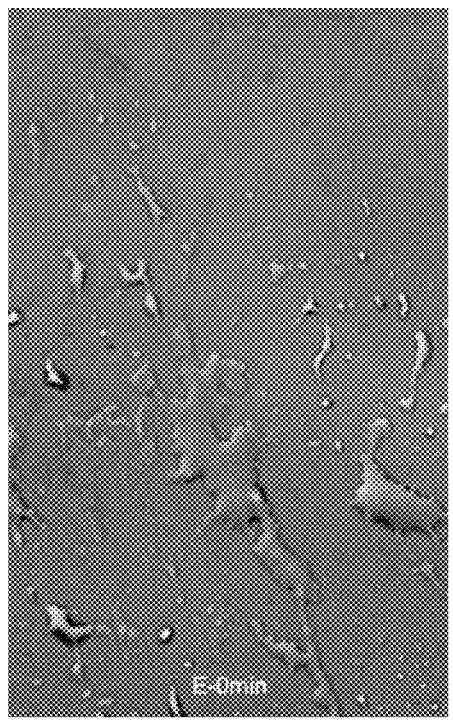 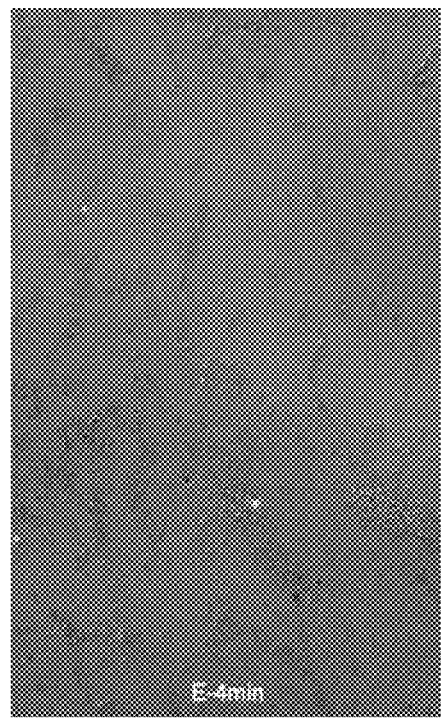
FIG. 2A          FIG. 2B

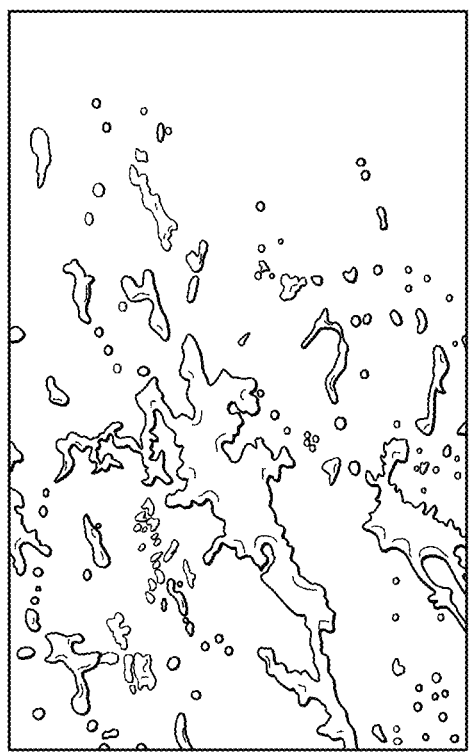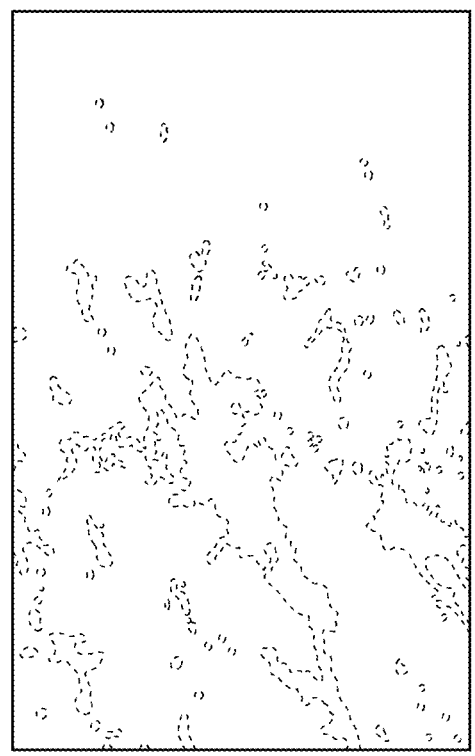
*FIG. 3A*  *FIG. 3B*

COATING COMPOSITIONS COMPRISING NON-IONIC SURFACTANT EXHIBITING REDUCED FINGERPRINT VISIBILITY

RELATED APPLICATION DATA

This application is a continuation of U.S. Ser. No. 13/307,137, filed Nov. 30, 2011, which claims the benefit of U.S. Provisional Application Ser. No. 61/424,768, filed Dec. 20, 2010; U.S. Provisional Application Ser. No. 61/486,000, filed May 13, 2011, and U.S. Provisional Ser. No. 61/530,460, Sep. 2, 2011.

BACKGROUND OF THE INVENTION

WO2008/067262 describes optical substrates having a surface layer that comprises the reaction product of a polymerizable mixture comprising at least one perfluoropolyether material comprising at least two free-radically polymerizable groups and at least one segment with greater than 6 ethylene oxide repeat units; and at least one non-fluorinated binder precursor comprising at least two free-radically polymerizable groups.

U.S. Pat. No. 7,153,563 describes a hard coat film comprising a substrate film and a hard coat layer disposed at least on one face of the substrate film, wherein the hard coat layer comprises 100 parts by weight of (A) a resin of an ionizing radiation curing type and 0.1 to 10 parts by weight of (B) a non-ionic surfactant. The hard coat film is used for protection of surfaces such as the surface of touch panels and displays. Attachment of fingerprints during input operations by fingers on the surfaces is suppressed and the attached fingerprints can be easily wiped out. Scratch resistance and wear resistance of conventional hard coat films are retained.

As described in the "Description of Related Art" in U.S. Pat. No. 7,153,563, to provide the property of preventing attachment of dirt and removing the attached dirt, it is frequently conducted that a silicone-based compound or a fluorine-based compound is added to conventional hard coat films having a hard coat layer which is formed and supported on a substrate film by curing by heating or with an ionizing radiation. However, the highly water-repellent surface obtained above does not always suppress the attachment of fingerprints and the attached fingerprints are more clearly visible. Conventional hard coat films have a drawback in that fingerprints are attached on the films after input operations with fingers and the attached fingerprints are not easily wiped out.

SUMMARY OF THE INVENTION

In some embodiments, coating compositions are described comprising a polymerizable resin composition and a (e.g. non-ionic) surfactant.

In one embodiment, the non-ionic surfactant is present in an amount ranging from greater than 10 wt-% to 25 wt-% solids. Further, the non-ionic surfactant preferably has a hydrophilic lipophilic balance ranging from 2 to 6. The coating composition may optionally comprise an additive comprising a silicone group or a fluorinated group. The coating composition may optionally comprise a polymerizable non-ionic surfactant.

In another embodiment, the coating composition comprises a polymerizable resin composition, a non-ionic surfactant, and an additive comprising a silicone group or a fluorinated group and a hydrophobic group, such as a long chain alkyl or alkenyl group. In some embodiments, the hydrophobic group of the additive is derived from a non-ionic surfactant.

The cured coatings preferably exhibit ink repellency that is related, in part, to the property of fingerprints being easily wiped off such cured coating. The fluorinated group and certain silicone additives can provide ink repellency.

The cured coating also exhibits another property concerning the visibility of fingerprints that is believed to not have been previously described, i.e. for an initially visible fingerprint to reduce in visibility as a function of time. Thus, in other embodiments, articles are described comprising a cured coating that exhibits a property of an initially visible (e.g. simulated) fingerprint reducing in visibility in 1-20 minutes.

Also described is a method of determining the fingerprint visibility of a coating composition comprising providing a coating composition on a substrate; applying a simulated fingerprint composition onto the coated substrate; and measuring the haze of the simulated fingerprint composition on the coated substrate.

Also described is a coated surface comprising a polymeric organic material comprising a plurality of pores wherein a portion of the pores are interconnected and comprise a lipophilic liquid. The coated lipophilic liquid is preferably a non-ionic surfactant. The lipophilic liquid is preferably present in an amount of at least 10 wt-% solids. Due to the interconnectivity of the pores a major amount of the lipophilic liquid can be solvent extracted from the coated surface.

BRIEF DESCRIPTION OF THE DRAWINGS

FIG. 1A is a digital photograph of a human fingerprint applied to a cured coating at a microscope setting of 12× (1.2× objective and a 10× multiplier).

FIG. 1B is a digital photograph of the human fingerprint applied to the cured coating of FIG. 1A five minutes later.

FIG. 2A is a digital photograph of a human fingerprint applied to a cured coating at a microscope setting of 500×.

FIG. 2B is a digital photograph of the human fingerprint applied to the cured coating of FIG. 2A four minutes later.

FIGS. 3A and 3B are illustrations of the photographs of FIGS. 2A and 2B respectively.

DETAILED DESCRIPTION AND PREFERRED EMBODIMENTS

Figure 4:
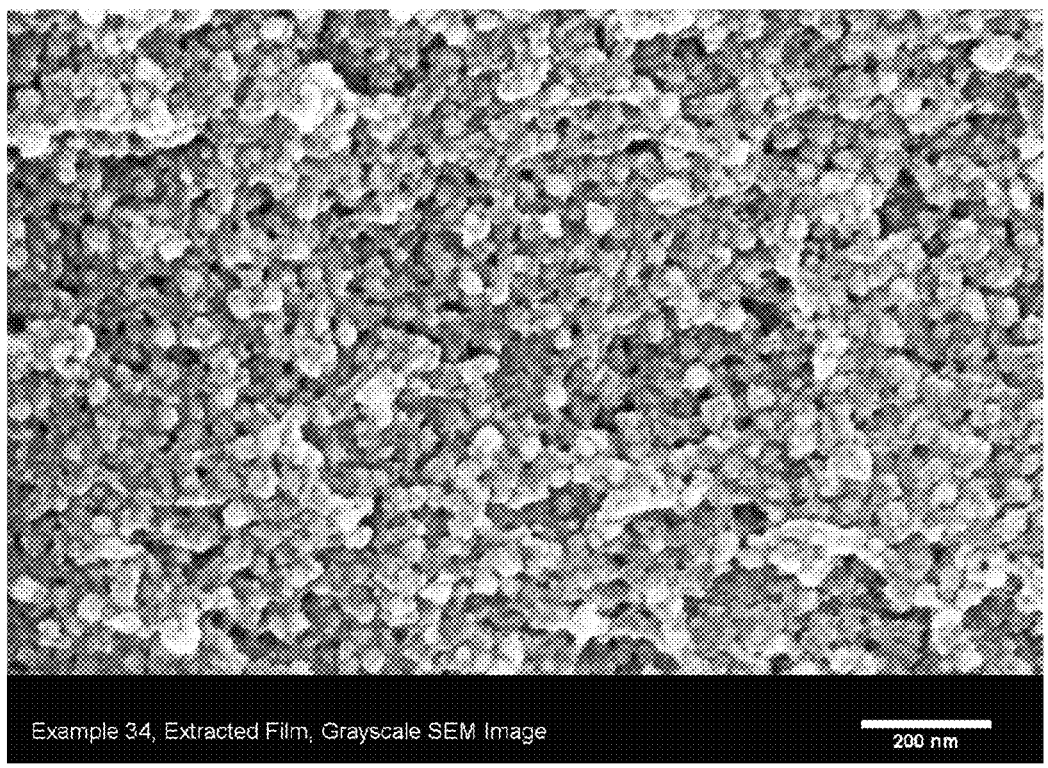
FIG. 4 is a scanning electron microscopy image of an illustrated cured coating after solvent extraction of the unpolymerizable surfactant.

The coating compositions described herein comprise a lipophilic liquid, such as a (e.g. non-ionic) surfactant. Such (e.g. non-ionic) surfactant is typically an unpolymerizable surfactant, meaning that the surfactant is not reacted or copolymerized with the other components of the coating composition. Hence, the (e.g. non-ionic) surfactant is unpolymerized in the cured coating composition. The (e.g. non-ionic) surfactant can also be characterized as "free" surfactant. In some embodiments, the coating compositions further comprise an unpolymerizable surfactant in combination with a polymerizable surfactant.

The coating composition preferably further comprises an additive comprising a low surface energy group, such as a silicone group or a fluorinated group. The additive also comprises a hydrophobic group. The hydrophobic group of the additive can be derived from a non-ionic surfactant. During the synthesis of the additive, the non-ionic surfactant, such as a fatty alcohol, is reacted with a silicone compound or a fluorinated compound.

Unless specified otherwise, the following description pertaining to non-ionic surfactants is applicable to both the unpolymerizable surfactant of the coating composition as well as the surfactant from which the hydrophobic group of the additive can be derived.

Non-ionic surfactants are organic compounds that are amphiphilic, comprising a hydrophobic group (or "tail") and a hydrophilic group (or "head"). Typically surfactant molecules migrate to the surface, where the hydrophobic group may extend out of the bulk coating phase, while the water soluble head group remains in the bulk coating phase. This alignment and aggregation of surfactant molecules at the surface acts to alter the surface properties of the coating.

A surfactant can be classified by the presence of formally charged groups in its head. The head of an ionic surfactant carries a net charge. A non-ionic surfactant has no charged groups in its head.

Surfactants can be characterized by various methodologies. One common characterization method, as known in the art, is the hydrophilic-lipophilic balance ("HLB"). Although various methods have been described for determining the HLB of a compound, unless specified otherwise, as used herein HLB refers to the value obtained by the Griffin's method (See Griffin W C: "Calculation of HLB Values of Non-Ionic Surfactants," Journal of the Society of Cosmetic Chemists 5 (1954): 259). The computations were conducted utilizing the software program Molecular Modeling Pro Plus from Norgwyn Montgomery Software, Inc. (North Wales, Pa.).

According to Griffin's method:

$$HLB = 20 * Mh/M$$

where Mh is the molecular mass of the hydrophilic portion of the molecule, and M is the molecular mass of the whole molecule. This computation provides a numerical result on a scale of 0 to 20, wherein "0" is highly lipophilic.

Griffin's method is typically used to calculate the HLB of a single molecule. However, various (e.g. commercially available) non-ionic surfactants comprise a mixture of molecules. When the surfactant comprises a mixture of molecules, the HLB can be calculated by the summation of the HLBs of the individual molecules multiplied by the weight fraction of each molecule.

A broad range of non-ionic surfactants may be utilized as the starting component in the synthesis of the additive. Without intending to be bound by theory, the additive is believed to act a compatibilizer for the "free" surfactant that is unpolymerized in the cured coating composition. The HLB of surfactants for use as a starting component in the synthesis of the additive may range from 1 to 19. The non-ionic surfactant utilized as the starting component in the synthesis of the additive is typically free of fluorine and silicone atoms.

The unpolymerizable (e.g. non-ionic) surfactant of the coating composition is more lipophilic then hydrophilic, i.e., an HLB less than 10. In favored embodiments, the HLB is at least 2 or 2.5 and no greater than about 6 or 5.5. In some favored embodiments, the coating composition comprises a (e.g. non-ionic) surfactant having an HLB of at least 3, or 3.5, or 4.0. Without intending to be bound by theory it is surmised that the lipophilic group of the surfactant may physically absorb the body oil of a fingerprint.

Such (e.g. non-ionic) surfactants generally comprise an alkyl or alkenyl group having at least 12, or 14, or 16, or 18 carbon atoms. Such relatively long chain alkyl or alkylene group is commonly referred to as a "fatty" group. The number of carbon atoms can be greater than 18 carbon atoms provided the (e.g. non-ionic) surfactant is a liquid at ambient temperature (e.g. 25° C.). The liquid (e.g. non-ionic) surfactant may further comprise up to 20 wt-% of a solid fraction. In some embodiments, the alkyl or alkenyl group has no greater than 24 carbon atoms. In some favored embodiments, such alkyl group is unbranched. The alkyl or alkenyl group may optionally comprise substituents, provided that the (e.g. non-ionic) surfactant is sufficiently lipophilic, e.g. having an HLB as previously described. The unpolymerizable non-ionic surfactant is also typically free of fluorine and silicone atoms.

Surfactants having the preferred HLB range (e.g. by inclusion of a fatty group) are generally non-ionic surfactants. However, other classes of surfactants may also be suitable provided such surfactant is sufficiently lipophilic as described herein.

Various classes of non-ionic surfactants are known including for example fatty alcohols, fatty acids, fatty amines, fatty amides, and derivatives thereof.

In some embodiments, such as for use as a starting compound in the synthesis of the additive, the non-ionic surfactant is a fatty alcohol. Fatty alcohols typically have the general formula

wherein R is a (e.g. straight or branched chain) alkyl or alkenyl group, as previously described, optionally substituted in available positions by N, O, or S atoms. Various fatty alcohols are known including dodecyl alcohol, cetyl alcohol $CH_3(CH_2)_{15}OH$, stearyl alcohol (also known as octadecyl alcohol or 1-octadecanol), and oleyl alcohol.

In some embodiments, the non-ionic surfactant is a derivative of a fatty alcohol. One favored derivative is a fatty alcohol, ester or derivative thereof comprising repeat units of ethylene oxide and/or repeat units of propylene oxide. Such derivatives may also be referred to as a polyethoxylated and/or polypropoxylated fatty alcohols, esters, or derivatives thereof. Such derivatives are a favored unpolymerizable non-ionic surfactant of the coating composition and can also be utilized as a starting compound in the synthesis of the additive. One illustrative commercially available surfactant of this type is available from Croda as "Brij O2", reported to have an HLB of 4.9. Such polyethoxylated alcohol comprises a mixture of molecules having the general formula

If "n" were 1, such structure has a calculated HLB of 3.9. Further, if "n" were 2, such structure has a calculated HLB of 5.6. If "n" were 0, such structure (i.e. oleyl alcohol) has a calculated HLB of 1.1. Since the HLB is reported (by the supplier) to be 4.9, it is believed to be a mixture of such species.

In other embodiments, the non-ionic surfactant is a derivative of a fatty acid. Fatty acids typically have the formula

where R is a (e.g. straight chain) alkyl or alkenyl group, as previously described One class of fatty acid derivative can be prepared by reacting a fatty acid with a short chain alkyl glycol mono alkyl ether. Illustrative non-ionic surfactants of this type are described in the following table.

| Surfactant | HLB |
|---|---|
| Reaction product of oleic acid and diethylene glycol monoethyl ether | 4.7 |
| Reaction product of oleic acid and dipropylene glycol monomethyl ether | 2.8 |
| Reaction product of oleic acid and triethylene glycol monoethyl ether | 6.2 |
| Reaction product of oleic acid and triethylene glycol mono-n-butyl ether | 5.1 |
| Reaction product of oleic acid and 1-methoxy-2-propanol | 2.0 |
| Reaction product of oleic acid and ethylene glycol monomethyl ether | 3.1 |

Such derivatives having a HLB no greater than 6, as previously described, are also favored unpolymerizable non-ionic surfactants of the coating composition and can also be utilized as a starting compound in the synthesis of the additive. Derivatives having HLB values of 6 or greater can be utilized in the synthesis of the additive.

The molecular weight of the (e.g. free) surfactant is typically at least 150 g/mole and generally no greater than 600 g/mole. In some embodiments, the molecular weight of the surfactant is at least 200 g/mole, 250 g/mole, or 300 g/mole.

In some embodiments, the coating composition lacks an additive. In this embodiment, the non-ionic surfactant is present in an amount greater than 10 wt-% solids of the coating composition. In some embodiments, the concentration of non-ionic surfactant is at least 11 wt-% or 12 wt-%. At such concentration, the visibility of a fingerprint as a function of time may be reduced by about 10% in 1 or 2 minutes. In some embodiments, the concentration of non-ionic surfactant is at least 13 wt-% or 14 wt-%. In the absence of an additive, such coating compositions may reduce the visibility of a fingerprint by about 20% in 1 or 2 minutes. In yet other embodiments, the concentration of non-ionic surfactant is 15 wt-%, 16 wt-%, or 17 wt-%. The concentration of the non-ionic surfactant is typically no greater than 25 wt-% and in favored embodiments no greater than 20 wt-%.

In some embodiments, the coating composition further comprises a (e.g. free-radically) polymerizable non-ionic surfactant in combination with the unpolymerized surfactant. In this embodiment, the concentration of polymerizable and unpolymerizable non-ionic surfactant is greater than 10 wt-% solids of the coating composition and typically no greater than 30 wt-%, or 25 wt-%, 20 wt-%. The inclusion of a (e.g. free-radically) polymerizable non-ionic surfactant is amenable to compatibilizing the free surfactant. The inclusion of such can provide higher concentrations of free surfactant in combination with lower haze (as compared to the same concentration of free surfactant without a polymerizable surfactant). The (e.g. free-radically) polymerizable non-ionic surfactant may be present in the coating composition at a concentration of at least 1, or 2, or 3 wt-%. The concentration of (e.g. free-radically) polymerizable non-ionic surfactant is typically no greater than the concentration of free surfactant. In some embodiments, the weight ratio of free surfactant to polymerizable surfactant is at least 1.5:1 or 2:1.

Polymerizable surfactants have been described in the art. A non-ionic surfactant comprising a (meth)acrylate group can be formed by reacting the hydroxyl group of the previously described fatty alcohols and derivatives thereof with a (meth)acrylic acid or a (meth)acryloyl halide, or functional (meth)acrylate compound such as an isocyanato-functional (meth)acrylate compound.

In favored embodiments, the coating composition comprises an additive comprising a hydrophobic group and a low surface energy group, such as a silicone or fluorinated group. The additive may be present is an amount of at least 0.01, or 0.05, or 0.10 wt-% solids ranging up to about 10 wt-% solids of the coating composition. In some embodiments, the concentration of additive is no greater than about 5 wt-%, 4 wt-% or 3 wt-% solids of the coating composition.

In some embodiments, the inclusion of the additive provides lower fingerprint visibility as a function of time at the same surfactant concentration. In this embodiment, the coating composition further comprising the additive may have the same non-ionic surfactant concentration as previously described. The additive may also allow for higher concentrations of the non-ionic surfactant with lower haze.

In other embodiments, lower fingerprint visibility as a function of time may be achieved with lower concentrations of surfactant by inclusion of the additive. In this embodiment, the concentration of surfactant may be lower than 10 wt-%. For example, the minimum concentration of non-ionic surfactant may be 5 wt-%, or 6 wt-%, or 7 wt-%, or 8 wt-%, or 9 wt-%. However in favored embodiments, the coating composition comprises greater than 10 wt-% of non-ionic surfactant in combination with an additive having a hydrophobic group and a low surface energy group, such as a silicone group or fluorinated group.

The silicone group or fluorinated group generally lowers the surface energy of the coating composition and thus may be characterized as a low surface energy group.

The silicone group is typically derived from an organosiloxane. Preferred silicon-containing resins are organopolysiloxanes. Organopolysiloxanes are known in the art and are described for example in U.S. Pat. No. 3,159,662 (Ashby); U.S. Pat. No. 3,220,972 (Lamoreauz); U.S. Pat. No. 3,410,886 (Joy); U.S. Pat. No. 4,609,574 (Keryk); U.S. Pat. No. 5,145,886 (Oxman, et. al); U.S. Pat. No. 4,916,169 (Boardman et. al); and U.S. Pat. No. 7,192,795 (Boardman et. al).

Suitable polyorganosiloxanes include linear, cyclic or branched organosiloxanes of the formula $R^1{}_b[(R^2{}_a SiO_{(4-a)/2})_c]_{(3-b)}Si$—X, wherein $R^1$ is a monovalent, straight-chained, branched or cyclic, unsubstituted or substituted hydrocarbon group containing from 1 to 18 carbon atoms; $R^2$ is a monovalent hydrocarbon group from 2 to 10 carbon atoms; X is —$(CH_2)_d$—Y where Y is —OH, —$NH_2$, or —$NHR^3$, where d=0-10, and $R^3$ is a lower alkyl or cycloalkyl of 1 to 6 carbon atoms; each a is independently 0, 1, 2 or 3; b is 0, 1 or 2; and c is 5 to 300.

$R^1$ is typically as alkyl group such as methyl, ethyl, n-propyl, iso-propyl, n-butyl, iso-butyl, tert-butyl, n-pentyl, iso-pentyl, neo-pentyl, tert-pentyl, cyclopentyl, n-hexyl, cyclohexyl, n-octyl, 2,2,4-trimethylpentyl, n-decyl, n-dodecyl, and n-octadecyl; aromatic groups such as phenyl or naphthyl; alkaryl groups such as 4-tolyl; aralkyl groups such as benzyl, 1-phenylethyl, and 2-phenylethyl; and substituted alkyl groups such as 3,3,3-trifluoro-n-propyl, 1,1,2,2-tetrahydroperfluoro-n-hexyl, and 3-chloro-n-propyl.

Although a silicone-containing low surface energy group additive in combination with the surfactant can provide the property of reduced fingerprint visibility as a function of time, a fluorinated group, and especially a perfluoropolyether group, can be favored for concurrently providing ink repellency.

Certain silicone additives have also been found to provide ink repellency in combination with low lint attraction, as described in WO 2009/029438; incorporated herein by reference. Such silicone(meth)acrylate additives generally comprise a polydimethylsiloxane (PDMS) backbone and at least one alkoxy side chain terminating with a (meth)acrylate group. The alkoxy side chain may optionally comprise at least one hydroxyl substituent. Such silicone(meth)acrylate additives are commercially available from various suppliers such as Tego Chemie under the trade designations TEGO Rad 2300 "TEGO Rad 2250", "TEGO Rad 2300", "TEGO Rad 2500", and "TEGO Rad 2700". Of these, "TEGO Rad 2100" provided the lowest lint attraction.

Based on NMR analysis "TEGO Rad 2100" and "TEGO Rad 2500" are believed to have the following chemical structure:

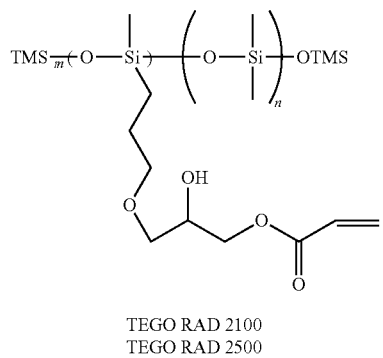

TEGO RAD 2100
TEGO RAD 2500 wherein n ranges from 10 to 20 and m ranges from 0.5 to 5.

In some embodiments, n ranges from 14 to 16 and n ranges from 0.9 to 3. The molecular weight typically ranges from about 1000 g/mole to 2500 g/mole.

Based on Thermal Gravimetric Analysis (according to the test method described in the example), silicone(meth)acrylates having a residue content of less than 12 wt-% provided the lowest haze values according to the Cellulose Surface Attraction Test.

The surface layers (e.g. comprising such silicone(meth) acrylate additives) preferably have a haze of less than 20%, more preferably less than 10% and even more preferably less than 5% according to the Cellulose Surface Attraction Test.

The cured surface layer and coated articles exhibit "ink repellency" when ink from a pen, commercially available under the trade designation "Sharpie", beads up into discrete droplets and can be easily removed by wiping the exposed surface with tissues or paper towels, such as tissues available from the Kimberly Clark Corporation, Roswell, Ga. under the trade designation "SURPASS FACIAL TISSUE."

A surface comprising the cured coating described herein preferably exhibits a high advancing contact angle with water of at least 70 degrees. More preferably, the advancing contact angle with water is at least 80 degrees and more preferably at least 90 degrees. Cured coating compositions comprising fluorinated additives and silicone additives (e.g. TEGO® Rad 2100) typically exhibit high advancing contact angles with water.

The surface comprising the cured coating described herein preferably exhibits a receding contact angle with hexadecane of at least 40, 45 or 50 degrees and typically no greater than 60 degrees.

The coating composition described herein can be used to form a (e.g. cured) surface layer, a coated article, or a coated surface such as by applying the coating composition to a surface (e.g. of a substrate or article) and curing polymerizable components of the coating composition. Once polymerizable components present in the coating composition have been cured, a suitable solvent (such as hexane in some embodiments) can be used to extract the lipophilic liquid, such as the unpolymerizable surfactant, from the coated surface or cured coating composition.

FIG. 4 is a scanning electron microscopy image of an illustrative cured coating after solvent extraction. The coated surface comprises a polymeric organic material comprising a plurality of pores. Although the cured coating composition (i.e. surface layer) may comprise nano-sized pores (e.g. less than 200, or 100, or 50 nanometers), the cured coating is typically free of pores of 1 micron or greater. In some embodiments, the average diameter of the pores is at least 10, 15, or 20 nanometers.

With reference to FIG. 4, as is evident by the darkest regions, a portion of the pores are interconnected, forming a network (e.g. of tunnels). The lipophilic liquid (e.g. unpolymerizable surfactant) is present in the pores of the polymeric organic material. Without intending to be bound by theory, it is surmised that the wt-% of extractable lipophilic liquid (e.g. unpolymerizable surfactant) relates to the extent of interconnectivity of the pores, as well as the concentration of lipophilic liquid (e.g. unpolymerizable surfactant) present in the coating of the coated surface. It has been found that when a coating composition comprises a low amount of unpolymerizable surfactant (e.g. about 3 wt-%), the amount of lipophilic extractable material relative to the total weight of the coating composition is less than 0.02 wt-%. At this relatively low concentration of free lipophilic liquid (i.e. not covalently bonded to the polymeric organic material), the lipophilic liquid is surmised to be evenly distributed throughout the coated surface. Although a small portion of the lipophilic liquid is exposed at the outermost surface, the majority of the lipophilic liquid is within the cured coating beneath the exposed surface, resulting in only a fraciction of the total amount of lipophilic liquid being extractable (0.02/3=0.0067).

However, when the coating composition comprises greater amounts of lipophilic liquid (e.g. unpolymerizable surfactant) the (i.e. cured) coating composition comprises at least 0.5, 1, 2, 3, 4, or 5 wt-% of solvent extractable lipophilic material. The concentration of material that can be solvent extracted from the coated surface is typically no greater than 15 wt-% and in favored embodiments, no greater than 10 wt-%.

As the concentration of lipophilic liquid (e.g. unpolymerizable surfactant) increases, the number and/or size of the pores increase such that a network of interconnected pores is formed. This may be caused by nanoscopic phase separation of the lipophilic liquid (e.g. unpolymerizable surfactant) from the polymerized resin. If all the lipophilic liquid (e.g. unpolymerizable surfactant) was accessible for extraction, then all the lipophilic liquid would be present in pores exposed to the surface as isolated pores, interconnected pores, or a combination thereof. Thus, 100% of the total pores are present as isolated pores, interconnected pores, or a combination thereof. Typically, less than all the lipophilic liquid (e.g. unpolymerizable surfactant) is solvent extractable from the coated surface. For example, in some embodiments, typically no greater than 90 wt-% or 95 wt-% of the total lipophilic liquid (e.g. unpolymerizable surfactant) is solvent extractable from the cured coating. Thus, 5 or 10% of the lipophilic liquid-containing pores are unexposed to the surface as buried pores. In some embodiments, at least 10, 15, 20, 25, 30, 35, 40, 45, or 50% of the lipophilic liquid-containing pores are exposed to the surface as isolated pores, interconnected pores, or a combination thereof. Further, the lipophilic liquid-containing pores exposed to the surface as isolated pores, interconnected pores, or a combination thereof, may range up to 75, 80, 85, or 90%.

The pore volume of a (e.g. cured) coating or coated (e.g. film) surface can be determined using various techniques in the art. One technique developed by Brunauer, Emmett and Teller, see S. Brunauer, "Physical Adsorption" (Princeton University Press, Princeton, N.J., 1945, is commonly referred to as "BET" gas adsorption. In some embodiments, the coated surface described herein comprises a plurality of pores having a pore volume of at least 0.01 cc/g, or 0.02 cc/g. In some embodiments, the pore volume is no greater than 0.15 cc/g, or no greater than 0.10 cc/g, or no greater than 0.09 cc/g, or no greater than 0.08 cc/g, or no greater than 0.07 cc/g. BET gas adsorption can also be used to determine the surface area of a surface. In some embodiments, the surface area of the coated surface described herein is at least 1 m²/g, or 5 m²/g, or 10 m²/g. The surface area is typically no greater than 50 m²/g, or 45 m²/g, or 40 m²/g, or 35 m²/g, or 30 m²/g.

In some embodiments, a gas adsorption isotherm of the coated surface has a Type H2 hysteresis loop, as described in the IUPAC publication "Reporting Physisorption Data for Gas/Solid Systems with Special Reference to the Determination of Surface Area and Porosity", Pure & Applied Chemistry, Volume 57, No. 4, pp. 603-619, 1985. A Type H2 hysteresis loop is characteristic of a system of disordered pores (i.e. random spatial arrangement of the pores) in a network of interconnected pores with some pore blocking (i.e. necking or small diameter passages between pores that provide some resistance to flow between interconnected pores.

Various fluorinated low surface energy groups are known including perfluoroalkyl groups and perfluoropolyether groups.

In some embodiments, the reactive groups of the components polymerized to form the additive are (meth)acrylate groups, thereby forming an additive comprising a polyacrylate backbone. A non-ionic surfactant comprising a (meth) acrylate group can be formed by reacting the hydroxyl group of the previously described fatty alcohols and derivatives thereof with a (meth)acrylic acid or a (meth)acryloyl halide, or functional (meth)acrylate compound such as an isocyanato-functional (meth)acrylate compound. Such (meth) acrylate functional surfactant can then be copolymerized with a fluorinated (meth)acrylate compound.

In some embodiments, the additive comprises a perfluoroalkyl group. The term "perfluoroalkyl group" includes alkyl groups in which all C—H bonds are replaced by C—F bonds as well as groups in which one hydrogen is present replacing a terminal fluorine atom. In some embodiments of perfluoroalkyl groups, when at least one hydrogen is present, the perfluoroalkyl group includes at least one difluoromethyl group. Suitable perfluoroalkyl groups comprise 3 to 12 (i.e., 3, 4, 5, 6, 7, 8, 9, 10, 11, or 12) carbon atoms.

In some embodiments, the polyacrylate additive composition comprises a unit represented by the formula:

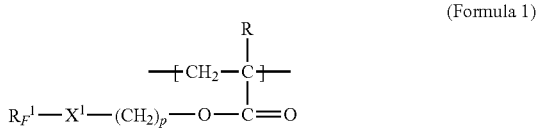

(Formula 1)

wherein $R_F^1$ is a perfluoroalkyl group and $X^1$ is a bond or a divalent linking group, such as —SO₂N(R)—, R of Formula 1 is hydrogen or alkyl having from 1 to 4 carbon atoms (e.g., methyl, ethyl, n-propyl, isopropyl, n-butyl, isobutyl, or sec-butyl), and p is independently an integer having a value from 2 to 11 (i.e., 2, 3, 4, 5, 6, 7, 8, 9, 10, or 11). In some embodiments, each $Rf^1$ is independently a perfluoroalkyl group having from 3 to 6 (e.g., perfluoro-n-hexyl, perfluoro-n-pentyl, perfluoroisopentyl, perfluoro-n-butyl, perfluoroisobutyl, perfluoro-sec-butyl, perfluoro-tert-butyl, perfluoro-n-propyl, or perfluoroisopropyl). In some embodiments, $Rf^1$ is perfluorobutyl (e.g., perfluoro-n-butyl). In some embodiments, $Rf^1$ is perfluoropropyl (e.g., perfluoro-n-propyl).

In one embodiment, the polyacrylate additive composition comprises a unit represented by formula:

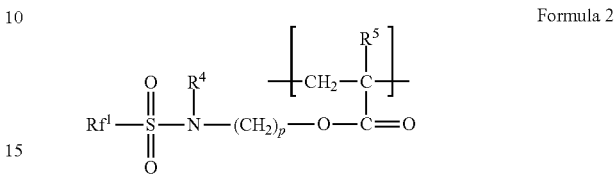

Formula 2 wherein $Rf^1$ is independently a perfluoroalkyl group, as previously described with respect to Formula 1.

R4 and R5 are each independently hydrogen or alkyl having from 1 to 4 carbon atoms (e.g., methyl, ethyl, n-propyl, isopropyl, n-butyl, isobutyl, or sec-butyl). In some embodiments, $R^4$ is selected from the group consisting of methyl and ethyl. In some embodiments, $R^5$ is selected from the group consisting of hydrogen and methyl.

p is independently an integer having a value from 2 to 11 (i.e., 2, 3, 4, 5, 6, 7, 8, 9, 10, or 11).

In one embodiment, the polyacrylate additive composition comprises a perfluoroalkyl unit having the formula:

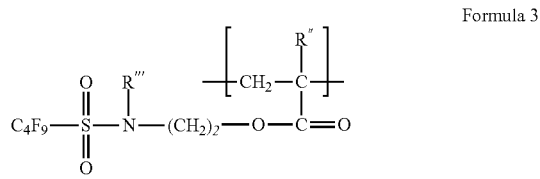

Formula 3 wherein R" and R'" are each independently hydrogen or alkyl having from 1 to 4 carbon atoms. In some embodiments, each R" is independently hydrogen or methyl. In some embodiments, R'" is methyl or ethyl.

Fluorinated free-radically polymerizable acrylate monomers comprising perfluoroalkyl groups, and methods for their preparation, are known in the art; (see, e.g., U.S. Pat. No. 2,803,615 (Albrecht et al.) and U.S. Pat. No. 6,664,354 (Savu et al.), the disclosures of which, relating to free-radically polymerizable monomers and methods of their preparation, are incorporated herein by reference). Methods described for making nonafluorobutanesulfonamido group-containing structures can be used to make heptafluoropropanesulfonamido groups by starting with heptafluoropropanesulfonyl fluoride, which can be made, for example, by the methods described in Examples 2 and 3 of U.S. Pat. No. 2,732,398 (Brice et al.), the disclosure of which is incorporated herein by reference. Methods for making other perfluoroalkyl compounds are known; (see, e.g., EP1311637 B1, published Apr. 5, 2006, and incorporated herein by reference for the disclosure of the preparation of 2,2,3,3,4,4,4-heptafluorobutyl 2-methylacrylate). Perfluoroalkyl compounds are also available from commercial sources (e.g., 3,3,4,4,5,5,6,6,6-nonafluorohexyl acrylate from Daikin Chemical Sales, Osaka, Japan and 3,3,4,4,5,5,6,6,6-nonafluorohexyl 2-methylacrylate from Indofine Chemical Co., Hillsborough, N.J.).

In favored embodiments, the additive comprises a perfluoropolyether group. The perfluoropolyether group $R_f$ can be linear, branched, cyclic, or combinations thereof and can be saturated or unsaturated. The perfluoropolyether has at least two catenated oxygen heteroatoms. Exemplary perfluoropolyethers include, but are not limited to, those that have perfluorinated repeating units selected from the group of —$(C_pF_{2p})$—, —$(C_pF_{2p}O)$—, —$(CF(Z))$—, —$(CF(Z)O)$—, —$(CF(Z)C_pF_{2p}O)$—, —$(C_pF_{2p}CF(Z)O)$—, —$(CF_2CF(Z)O)$—, or combinations thereof. In these repeating units, p is typically an integer of 1 to 10. In some embodiments, p is an integer of 1 to 8, 1 to 6, 1 to 4, or 1 to 3. The group Z is a perfluoroalkyl group, perfluoroether group, perfluoropolyether, or a perfluoroalkoxy group, all of which can be linear, branched, or cyclic. The Z group typically has no more than 12 carbon atoms, no more than 10 carbon atoms, or no more than 9 carbon atoms, no more than 4 carbon atoms, no more than 3 carbon atoms, no more than 2 carbon atoms, or no more than 1 carbon atom. In some embodiments, the Z group can have no more than 4, no more than 3, no more than 2, no more than 1, or no oxygen atoms. In these perfluoropolyether structures, the different repeat units can be distributed randomly along the chain.

$R_f$ can be monovalent or divalent. In some compounds where $R_f$ is monovalent, the terminal groups can be $(C_pF_{2p+1})$—, $(C_pF_{2p+1}O)$—, $(X'C_pF_{2p}O)$—, or $(X'C_pF_{2p-1})$— where X' is hydrogen, chlorine, or bromine and p is an integer of 1 to 10. In some embodiments of monovalent $R_f$ groups, the terminal group is perfluorinated and p is an integer of 1 to 10, 1 to 8, 1 to 6, 1 to 4, or 1 to 3. Exemplary monovalent $R_f$ groups include $CF_3O(C_2F_4O)_nCF_2$—, $C_3F_7O(CF_2CF_2CF_2O)_nCF_2CF_2$—, and $C_3F_7O(CF(CF_3)CF_2O)_nCF(CF_3)$— wherein n has an average value of 0 to 50, 1 to 50, 3 to 30, 3 to 15, or 3 to 10.

Suitable structures for divalent $R_f$ groups include, but are not limited to, —$CF_2O(CF_2O)_q(C_2F_4O)_nCF_2$—, —$(CF_2)_3O(C_4F_8O)_n(CF_2)_3$—, —$CF_2O(C_2F_4O)_nCF_2$—, —$CF_2CF_2O(CF_2CF_2CF_2O)_nCF_2CF_2$—, and —$CF(CF_3)(OCF_2CF(CF_3))_sOC_tF_{2t}O(CF(CF_3)CF_2O)_nCF(CF_3)$—, wherein q has an average value of 0 to 50, 1 to 50, 3 to 30, 3 to 15, or 3 to 10; n has an average value of 0 to 50, 3 to 30, 3 to 15, or 3 to 10; s has an average value of 0 to 50, 1 to 50, 3 to 30, 3 to 15, or 3 to 10; the sum (n+s) has an average value of 0 to 50 or 4 to 40; the sum (q+n) is greater than 0; and t is an integer of 2 to 6.

For embodiments wherein Rf is divalent and two (e.g. terminal) reactive groups are bonded to Rf (such as in the case of a diol), the concentration of such divalent monomer is sufficiently low as to avoid excessive crosslinking that can result in formation of a gel.

In some embodiments, the polyacrylate additive composition comprises a unit represented by the following Formula 4:

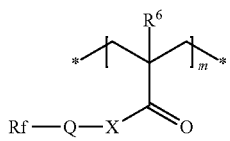

wherein
Rf is a monovalent perfluoropolyether group;
Q is a connecting group having a valency of at least 2;
X is O, S, or NR, where R is H or lower alkyl of 1 to 4 carbon atoms, $R^6$ is hydrogen or alkyl having from 1 to 4 carbon atoms (e.g., methyl, ethyl, n-propyl, isopropyl, n-butyl, isobutyl, or sec-butyl).

Q can comprise a straight chain, branched chain, or cyclic-containing connecting group. Q can include an alkylene, an arylene, an aralkylene, an alkarylene. Q can optionally include heteroatoms such as O, N, and S, and combinations thereof. Q can also optionally include a heteroatom-containing functional group such as carbonyl or sulfonyl, and combinations thereof.

The polyacrylate additive further comprises a unit represented by the following Formula 5:

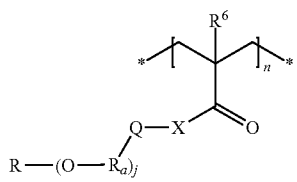

wherein R is a hydrophobic group, such as an alkyl or alkenyl group having greater than 6, 7, or 8 carbon atoms, as previously described;

Ra is independently an alkylene group $C_xH_{2x}$ where x=2 to 4, in which $C_xH_{2x}$ may be straight chain or branched or a combination of the two;

j is the number of alkylene oxide repeat units and ranges from 0 to 50; and $R^6$ is the same as previously described with respect to Formula 4.

In favored embodiments, j ranges from 7 to 50.

In some embodiments, wherein the polyacrylate additive further comprises (meth)acrylate polymerizable group, the additive further comprises a unit represented by the following Formula 6:

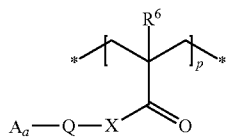

wherein
A is a (meth)acryl functional group such as —XC(O)C(R2)=CH2, where R2 is a lower alkyl of 1 to 4 carbon atoms or H or F;

a ranges from 1 to 6; and

Q and X are the same as previously described with respect to Formula 4.

The number of each of the respective units of the polyacrylate additive can vary. For example, m and n may each independently range from 1 to 100 and p may range from 1 to 50. In some embodiments, m and n are at least 1, 2, 3, 4, 5, 6, 7, 8, 9 or 10 and typically no greater than 50. Further, the ratio of the number of m repeat units to the number of n repeat units can range from about 0.10:1 to about 1:0.10, and preferably from about 0.25:1 to about 1:0.25

The polyacylate composition may have the general following Formula 7:

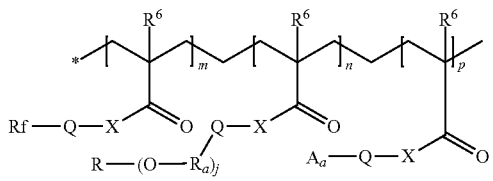

wherein each of these symbols are the same as previously described with respect to Formulas 4-6.

One example of a preferred polyacrylate additive is depicted as follows:

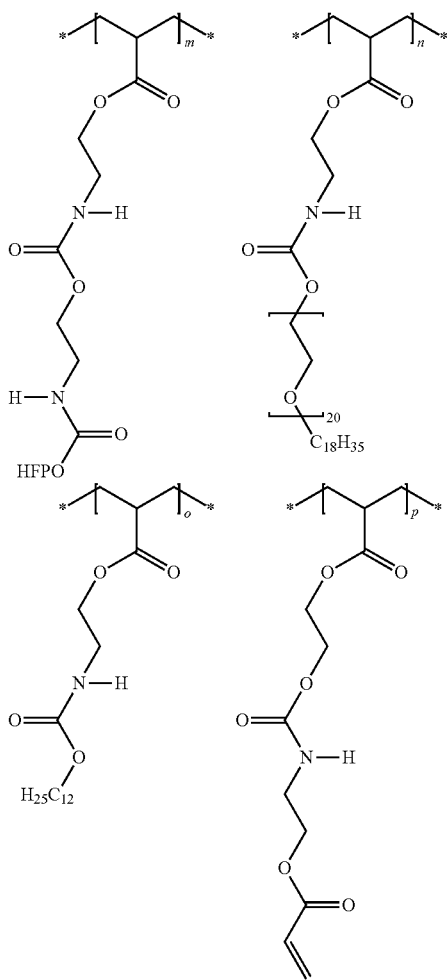

wherein the weight percentage of the polymer contributed by the units m, n, o, p are respectively 33.8, 31.6, 25.3, and 6.44. The $C_{18}H_{35}$ is the hydrocarbon residue of oleyl alcohol. "HFPO—" refers to the end group $F(CF(CF_3)CF_2O)aCF(CF_3)$— of the methyl ester $F(CF(CF_3)CF_2O)aCF(CF_3)C(O)OCH3$, wherein "a" averages 2 to 15.

Free-radically polymerizable acrylate monomers comprising perfluoropolyether groups, and methods for their preparation, are known in the art.

The perfluoropolyether(meth)acrylate compounds can be synthesized by known techniques such as described in U.S. Pat. Nos. 3,553,179 and 3,544,537 as well as U.S. Patent Application Publication No. US2004/0077775, published Apr. 22, 2004, "Fluorochemical Composition Comprising a Fluorinated Polymer and Treatment of a Fibrous Substrate Therewith".

Suitable perfluoropolyether(meth)acrylate compounds include for example HFPO—C(O)NHCH$_2$CH$_2$OC(O)CH=CH$_2$, HFPO—C(O)NHCH$_2$CH$_2$OCH$_2$CH$_2$OCH$_2$CH$_2$OC(O)CH=CH$_2$, HFPO—C(O)NH—(CH$_2$)$_6$OC(O)CH=CH$_2$ and various other perfluoropolyether compounds such as described in U.S. Publication No. US2005/0250921 and U.S. Publication No. US2005/0249940; incorporated by reference.

(Meth)acrylate copolymers comprising perfluoropolyether moieties and their preparations are known in the art. See WO2009/076389, Qiu et. al. These preparations may employ chain transfer agents such as thiols, and thermal initiators such as peroxides and azo compounds.

In other embodiments, the reactive groups of the components polymerized to form the additive comprise a combination of (poly)isocyanate compounds and isocyanate-reactive compounds, thereby forming an additive comprising urethane linkages.

One exemplary (e.g. free-radically) polymerizable additive is a perfluoropolyether urethane material that comprises a mixture of reaction products of
i) at least one polyisocyanate,
ii) at least one isocyanate reactive perfluoropolyether compound,
iii) at least one isocyanate reactive compound comprising a hydrophobic group, and
iv) at least one isocyanate reactive (e.g. non-fluorinated) hydrocarbon crosslinker comprising two or more free-radically polymerizable groups.

The perfluoropolyether compound (i.e. ii) and isocyanate reactive compound comprising a hydrophobic group (i.e. iii) preferably comprise at least one (e.g. terminal) alcohol, thiol, or amine group. Typically both the perfluoropolyether compound (i.e. ii) and the isocyanate reactive compound comprising a hydrophobic group (i.e. iii) contain (e.g. terminal) reactive alcohol groups. Additives comprising perfluoroalkyl groups or silicone groups can be prepared in a similar manner by substituting an isocyanate reactive perfluoroalkyl compound or isocyanate reactive silicone compound in place of the at least one isocyanate reactive perfluoropolyether compound (i.e. ii).

One or more polyisocyanate materials are employed in the preparation of the perfluoropolyether urethane. A variety of polyisocyanates may be utilized as component i) in the preparation of the perfluoropolyether urethane polymeric material. "Polyisocyanate" means any organic compound that has two or more reactive isocyanate (—NCO) groups in a single molecule such as diisocyanates, triisocyanates, tetraisocyanates, etc., and mixtures thereof. Cyclic and/or linear polyisocyanate molecules may usefully be employed. For improved weathering and diminished yellowing the polyisocyanate(s) of the isocyanate component is typically aliphatic.

For embodiments wherein the perfluoropolyether compound, ethylene oxide repeat unit-containing compound, and hydrocarbon crosslinker have monofunctional isocyanate reactivity the isocyanate employed is typically at least trifunctional. However, when one of more of the isocyanate reactive compounds have at least difunctional isocyanate reactivity, difunctional polyisocyanates can be employed.

Useful aliphatic polyisocyanates include, for example, bis(4-isocyanatocyclohexyl) methane ($H_{12}$ MDI) such as available from Bayer Corp., Pittsburgh, Pa. under the trade designation "Desmodur W"; isophorone diisocyanate (IPDI) such as commercially available from Huels America, Piscataway, N.J.; hexamethylene diisocyanate (HDI) such as commercially available from Aldrich Chemical Co., Milwaukee, Wis.; trimethyl hexamethylene diisocyanate such as commercially available from Degussa, Corp., Dusseldorf, Germany under the trade designation "Vestanate TMDI"; and m-tetramethylxylene diisocyanate (TMXDI) such as commercially available from Aldrich Chemical Co., Milwaukee, Wis. Although typically less preferred, aromatic isocyanates such as diphenylmethane diisocyanate (MDI) such as commercially available from Bayer Corp., Pittsburgh, Pa. under the trade designation "Mondor M"; toluene 2,4-diisocyanate (TDI) such as commercially available from Aldrich Chemical Co., Milwaukee, Wis., and 1,4-phenylene diisocyanate are also useful.

Preferred polyisocyanates include derivatives of the above-listed monomeric polyisocyanates. These derivatives include, but are not limited to, polyisocyanates containing biuret groups, such as the biuret adduct of hexamethylene diisocyanate (HDI) available from Bayer Corp. under the trade designation "Desmodur N-100", polyisocyanates based on HDI containing isocyanurate groups, such as that available from Bayer Corp. under trade designation "Desmodur N-3300", as well as polyisocyanates containing urethane groups, uretdione groups, carbodiimide groups, allophonate groups, and the like. These derivatives are preferred as they are polymeric, exhibit very low vapor pressures and are substantially free of isocyanate monomer.

Other polyisocyanates that may be used are available from Bayer Polymers LLC of Pittsburgh, Pa. under the trade designations "Desmodur TPLS2294", and "Desmodur N 3600"

One or more isocyanate reactive perfluoropolyether materials are employed in the preparation of the perfluoropolyether urethane. Various isocyanate reactive perfluoropolyethers materials can be utilized as component ii). The synthesis of various perfluoropolyether materials having (e.g. terminal) isocyanate reactive groups such as OH, SH or NHR wherein R is H of an alkyl group of 1 to 4 carbon atoms is known. For example, a methyl ester material (e.g. having an average molecular weight of 1,211 g/mol) for preparation of the alcohol can be prepared according to the method reported in U.S. Pat. No. 3,250,808 (Moore et al.), with purification by fractional distillation. Perfluoropolyether alcohol materials can be made by a procedure similar to that described in U.S. Publication No. 2004/0077775, filed May 24, 2002. Perfluoropolyether alcohol materials having an SH group can be made using this same process by use of aminoethane thiol rather than aminoethanol. Perfluoropolyether amine materials can be synthesized as described in US 2005/0250921.

The isocyanate reactive perfluoropolyether materials include one or more compounds of those of the following Formula 8:

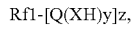

where

Rf1 is a monovalent (where z is 1) or divalent (where z is 2) perfluoropolyether;

Q is a connecting group having a valency of at least 2;

X is O, S, or NR, where R is H or lower alkyl of 1 to 4 carbon atoms;

y is 1 or 2, and z is 1 or 2.

Q can comprise a straight chain, branched chain, or cyclic-containing connecting group. Q can include an alkylene, an arylene, an aralkylene, an alkarylene. Q can optionally include heteroatoms such as O, N, and S, and combinations thereof. Q can also optionally include a heteroatom-containing functional group such as carbonyl or sulfonyl, and combinations thereof.

The perfluoropolyether urethane material is preferably prepared from an isocyanate reactive HFPO— material. Unless otherwise noted, "HFPO—" refers to the end group F(CF(CF$_3$)CF$_2$O)$_a$CF(CF$_3$)— of the methyl ester F(CF(CF$_3$)CF$_2$O)$_a$CF(CF$_3$)C(O)OCH$_3$, wherein "a" averages 2 to 15. In some embodiments, "a" averages between 3 and 10 or "a" averages between 5 and 8. Such species generally exist as a distribution or mixture of oligomers with a range of values for "a", so that the average value of a may be non-integer. For example, in one embodiment, "a" averages 6.2. The molecular weight of the HFPO— perfluoropolyether material varies depending on the number "a" of repeat units from about 940 g/mole to about 1600 g/mole, with 1100 g/mole to 1400 g/mole typically being preferred.

Various isocyanate reactive compounds comprising a hydrophobic group can be utilized in the synthesis of the additive. Typically, the isocyanate reactive compound is a non-ionic surfactant. As previously described, a broad range of non-ionic surfactants are suitable for use as a starting component in the synthesis of the additive. In some embodiments, the non-ionic surfactant utilized as a component of the additive is more lipophilic than hydrophilic having an HLB ranging from about 1 (e.g. oleyl alcohol) to about 10 (e.g. ethoxylated oleyl alcohol). In some embodiments, the HLB ranges from 4 to 8. In other favored embodiments, the non-ionic surfactant utilized as a component of the additive is more hydrophilic than lipophilic having an HLB greater than 10. In some embodiments, the HLB ranges from 12 to 16. However, if the additive is too hydrophilic, the ink repellency is compromised.

In some embodiments, the isocyanate reactive compound comprising the hydrophobic group may be represented by the following Formula 9:

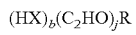

wherein

X is O, S or NR', where R' is H or lower alkyl of 1 to 4 carbon atoms;

R is a (optionally substituted) hydrophobic group, such as an alkyl or alkenyl group having greater than 6, 7, or 8 carbon atoms as previously described;

b is typically 1 or 2; and j ranges from 0 to 50.

R may optionally be substituted with a heteroatom, a heteroatom functional groups (such as —OH —SH, and —NH$_2$), or optionally substituted with a (meth)acryl functional group; or —C(O)C(R$_2$)=CH$_2$ where R$_2$ is a lower alkyl of 1 to 4 carbon atoms or H or F.

In favored embodiments, X is O and the isocyanate reactive non-ionic surfactant is a fatty alcohol (i.e. j=0), that is optionally ethoxylated and/or propoxylated (i.e. j is at least 1). R is typically no greater than 22 or 24. However, when a non-ionic surfactant is utilized to provide the hydrophobic group of the additive, the alkyl or alkenyl group may have a greater number of carbon atoms. Such higher number of carbon atoms may render the component or additive a solid at ambient temperature (e.g. 25° C.). Further, in favored embodiments b is preferably 1.

In some embodiments, the isocyanate reactive non-ionic surfactant comprises greater than 6 repeat units of ethylene oxide (i.e. j=6). The number of ethylene oxide repeat units may be at least 7, 8, or 9 repeat units. In some embodiments, the isocyanate reactive ethylene oxide containing compound has at least 10 repeat units of ethylene oxide. For example, the number of repeat units may be 11, 12, 13, 14, 15, 16, 17, 18, 19, or 20. Generally the number of ethylene oxide repeat units does not exceed about 50 and may be for example up to 25, 30, or 35 repeat units.

As an alternative to the ethylene oxide repeat units depicts in Formula 9, such compound may comprise other (e.g. C3-C4) alkylene oxide repeat units, such a propylene oxide repeat units or a combination of ethylene oxide repeat units and propylene oxide repeat units.

Various isocyanate reactive (e.g. non-fluorinated) hydrocarbon crosslinkers can be employed in the synthesis of the perfluoropolyether urethane polymeric additive. Such crosslinkers comprise at least two and preferably three free-radically polymerizable groups. The free-radically polymerizable groups are preferably (meth)acryl and more preferably (meth)acrylate groups.

Suitable isocyanate reactive non-fluorinated hydrocarbon crosslinkers may be described by the following Formula 10:

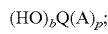

wherein
Q is a connecting group having a valency of at least 2;
A is a (meth)acryl functional group such as —XC(O)C(R2)=CH2, where
X is O, S or NR, where R is H or lower alkyl of 1 to 4 carbon atoms, and
$R_2$ is a lower alkyl of 1 to 4 carbon atoms or H or F;
b ranges from 1 to 4 and is preferably 1 or 2; and
p ranges from 2 to 6.

Q can comprise a straight chain, branched chain, or cyclic-containing connecting group as previously described.

Exemplary isocyanate reactive crosslinkers include for example 1,3-glycerol dimethacrylate available from Echo Resin Inc. of Versailles, Mo. and pentaerythritol triacrylate, available from Sartomer of Exton, Pa. under the trade designation "SR444C". Additional useful isocyanate reactive (meth)acrylate crosslinkers include hydantoin moiety-containing poly(meth)acrylates, for example, as described in U.S. Pat. No. 4,262,072 (Wendling et al.).

The hydrocarbon crosslinker (i.e. iv) typically comprises (meth)acryl groups such as (meth)acrylate groups. A substantial excess of hydrocarbon crosslinker (i.e. iv) is typically employed such that the perfluoropolyether urethane polymeric material as well as other reaction products of the reaction mixture comprise unreacted free-radically polymerizable groups which can be subsequently cured for example by radiation (e.g. UV) curing.

These reaction sequences are generally conducted in a solvent that does not contain hydroxyl groups (such as MEK) in the presence of a catalyst such as an organotin compound.

If the mole fraction of isocyanate groups is given a value of 1.0, then the total mole fraction of isocyanate reactive groups used in making the perfluoropolyether urethane material is 1.0 or greater. Although, the polymerizable compositions described herein typically comprise at least 0.2 mole fraction of crosslinking agent(s), it is typically preferred to maximize the concentration of isocyanate reactive hydrocarbon crosslinker to improve the durability and compatibility with the binder of the hardcoat. Accordingly, the total amount of crosslinking agent(s) may comprise at least 0.5 mole fraction and may be at least 0.6 mole fraction, at least 0.7 mole fraction, at least 0.8 mole fraction, or at least 0.9 mole of the sum of the isocyanate reactants. The mole fraction of the perfluoropolyether reactant is typically at least 0.05 and no greater than 0.5. The mole fraction of hydrophobic-group containing reactant (e.g. isocyanate reactive surfactant) is also typically at least 0.05 or 0.10 and no greater than 0.7, 0.6, or 0.5.

The reaction product generally includes a distribution of various reaction products. In addition to the reaction product of the polyisocyanate with all three reactants (ii, iii, and iv) the reaction product of the polyisocyanate with two of the three as well as reaction products of the polyisocyanate the individual reactants are also present.

In one preferred embodiment, the perfluoropolyether urethane composition is of the following Formula 11:

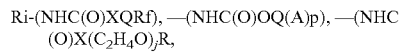

wherein Ri is a residue of a multi-isocyanate;
X are each independently O, S or NR', where R' is H or lower alkyl of 1 to 4 carbon atoms;
Q is independently a connecting group of valency at least 2;
Rf is a monovalent perfluoropolyether moiety composed of groups comprising the formula F(RfcO)xCdF2d-, wherein each Rfc independently represents a fluorinated alkylene group having from 1 to 6 carbon atoms, each x independently represents an integer greater than or equal to 2, and wherein d is an integer from 1 to 6;
A is a (meth)acryl functional group such as —XC(O)C(R2)=CH2, where R2 is a lower alkyl of 1 to 4 carbon atoms or H or F;
R is a hydrophobic group, such as an alkyl or alkenyl group having at least 6, 7, or 8 carbon atoms as previously described;
p is 2 to 6; and
j preferably ranges from 7 to 50.

However, in other embodiments j is 0, and thus the additive comprises a hydrophobic group in the absence of an (adjacent) ethylene oxide group or ethylene oxide repeat unit. The number of ethylene oxide repeat units (i.e. j) may also be 1, 2, 3, 4, 5, or 6.

As an alternative to the ethylene oxide repeat units depicts in Formula 11, such compound may comprise other (e.g. C3-C4) alkylene oxide repeat units, such a propylene oxide repeat units or a combination of ethylene oxide repeat units and propylene oxide repeat units.

Depending on the number of individual materials employed as well as the functionality of the reactants, a variety of perfluoropolyether urethane materials can be prepared having at least one of each of the units of this formula. Q in association with the Rf group is a straight chain, branched chain, or cycle-containing connecting group as previously described. In some embodiments when X is O, Q is typically not methylene and thus contains two or more carbon atoms. In other embodiments, X is S or NR. In some embodiments, Q is an alkylene having at least two carbon atoms. In other embodiments, Q is a straight chain, branched chain, or cycle-containing connecting group selected from arylene, aralkylene, and alkarylene. In yet other embodiments, Q contains a heteroatom such as O, N, and S and/or a heteroatom containing functional groups such as carbonyl and sulfonyl. In other embodiments, Q is a branched or cycle-containing alkylene group that optionally contains heteroatoms selected from O, N, S and/or a heteroatom-containing functional group such as carbonyl and sulfonyl. In some embodiments Q contains a nitrogen containing group such an amide group such as —C(O)NHCH$_2$CH$_2$—, —C(O)NH(CH$_2$)$_6$—, and —C(O)NH(CH$_2$CH$_2$O)$_2$CH$_2$CH$_2$—.

One representative structure of Formula 11 is formed by the reaction product of a biuret of HDI with one equivalent of HFPO oligomer amidol HFPO—C(O)NHCH$_2$CH$_2$OH wherein "a" averages 2 to 15, and further with one equivalent of pentaerythritol triacrylate and one equivalent of HO(CH$_2$CH$_2$O)$_{20}$C$_{18}$H$_{37}$ (stearyl alcohol 20 ethoxylate) is shown as follows:

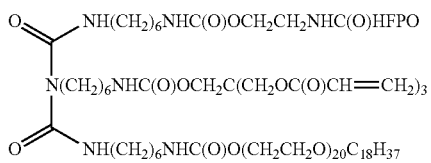

Various other reactants can be included in the preparation of the perfluoropolyether urethane such as described in WO2006/102383.

In one embodiment, a monofunctional perfluoropolyether compound and a monofunctional hydrophobic group-containing compound are employed as reactants with the polyisocyanate. In another embodiment, a multifunctional perfluoropolyether compound and a monofunctional hydrophobic group-containing compound are employed. When at least two multifunctional isocyanate reactive compounds are employed in the synthesis, the reaction product typically includes a major amount of a perfluoropolyether polymeric material.

Typically, the perfluoropolyether urethane composition is made by first reacting a polyisocyanate with a perfluoropolyether compound containing an alcohol, thiol, or amine group, followed by reaction with one or more hydrophobic group-containing compounds containing an alcohol, thiol, or amine group. The perfluoropolyether urethane additive is then combined with the (e.g. non-fluorinated) isocyanate reactive multifunctional free-radically polymerizable (e.g. (meth)acrylate) crosslinker. Alternatively, these perfluoropolyether urethane additives can be formed by other reaction sequences such as by first reacting the polyisocyanate with the crosslinker, followed by the addition of the hydrophobic group-containing compound. In addition, the perfluoropolyether urethane additive could be made by reacting all four components concurrently.

When the additive comprises greater than 6 repeat units of ethylene oxide, such additive may have improved compatibility with hydroxyl group containing solvents, commonly known as alcohols. Alcohol based coating compositions are especially useful for coating light transmissive substrates such as polycarbonate, acrylic, cellulose acetate, and cellulose triacetate which are susceptible to swelling, cracking, or crazing by organic solvents such as ketones (e.g. MEK), aromatic solvents (e.g. toluene), and esters (e.g. acetate solvents).

The non-ionic surfactant and additive, when present, are typically dispersed in a hardcoat composition in combination with a (e.g. alcohol based) solvent, applied to a surface or substrate, such as an optical substrate and photocured. The hardcoat is a tough, abrasion resistant layer that protects the optical substrate and the underlying display screen from damage from causes such as scratches, abrasion and solvents. Typically the hardcoat is formed by coating a curable liquid ceramer composition onto the substrate and curing the composition in situ to form a hardened film.

The coating composition described herein can be employed as a one-layer hardcoat composition. For embodiments wherein high durability is desired, the hardcoat composition typically further comprises (e.g. surface modified) inorganic particles, such as silica. The thickness of the hardcoat surface layer is typically at least 0.5 microns, preferably at least 5 micron, and more preferably at least 10 microns. The thickness of the hardcoat layer is generally no greater than 25 microns. Preferably the thickness ranges from 5 microns to 20 microns.

Alternatively, the coating composition may be free of inorganic oxides particles for uses where durability is not required. In yet other embodiments, an inorganic particle free surface layer may be provided in combination with an inorganic particle containing hardcoat layer disposed between the substrate and the surface layer. This will be referred to as a two-layer hardcoat. In these embodiments, the surface layer preferably has a thickness ranging from about 1 to 10 microns.

The coating compositions described herein are sufficiently durable such that the cured coating exhibits no evidence of scratching or only a few scratches (e.g. 1-3) when tested according to the steel wool abrasion resistance test method described in WO 2009/076389 and the forthcoming examples using a weight of 300 g and 10 wipes.

For one-layer hardcoat and two-layer hardcoat embodiments, the additive alone or in combination with other fluorinated compounds typically ranges from 0.01% to 10%, and more preferably from 0.1% to 5%, of the total solids of the hardcoat composition.

A variety of binder precursors that form a crosslinked polymeric matrix upon curing can be employed in the hardcoat. The isocyanate reactive non-fluorinated crosslinking materials previously described are suitable binder precursors.

Di(meth)acryl binder precursors include for example 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated bisphenol A diacrylate, hydroxypivalaldehyde modified trimethylolpropane diacrylate, neopentyl glycol diacrylate, polyethylene glycol diacrylate, propoxylated neopentyl glycol diacrylate, tetraethylene glycol diacrylate, tricyclodecanedimethanol diacrylate, triethylene glycol diacrylate, tripropylene glycol diacrylate.

Tri(meth)acryl binder precursor include for example glycerol triacrylate, trimethylolpropane triacrylate, ethoxylated trimethylolpropane triacrylates (e.g. having 3 to 20 ethoxylate repeat), propoxylated glyceral triacrylates, trimethylolpropane triacrylate, tris(2-hydroxyethyl)isocyanurate triacrylate. Higher functionality (meth)acryl containing compounds include for example ditrimethylolpropane tetraacrylate, dipentaerythritol pentaacrylate, ethoxylated pentaerythritol tetraacrylate, caprolactone modified dipentaerythritol hexaacrylate.

One commercially available form of pentaerythritol triacrylate ("PET3A") is SR444C and one commercially available form of pentaerythritol tetraacrylate ("PET4A") is SR295, each available from Sartomer Company of Exton, Pa.

Oligomeric (meth)acryl such as urethane acrylates, polyester acrylates, epoxy acrylates; and polyacrylamide analogues of the foregoing can also be employed as the binder.

In one embodiment, the binder may comprise one or more N,N-disubstituted acrylamide and or N-substituted-N-vinylamide monomers as described in Bilkadi et al. The hardcoat may be derived from a ceramer composition containing about 20 to about 80% ethylenically unsaturated monomers and about 5 to about 40% N,N-disubstituted acrylamide monomer or N-substituted-N-vinyl-amide monomer, based on the total weight of the solids in the ceramer composition.

To facilitate curing, polymerizable compositions described herein may further comprise at least one free-radical thermal initiator and/or photoinitiator. Typically, such an initiator and/or photoinitiator are present in an amount less than about 10 percent by weight, more typically less than about 5 percent of the polymerizable composition, based on the total weight of the polymerizable composition. Free-radical curing techniques are well known in the art and include, for example, thermal curing methods as well as radiation curing methods such as electron beam or ultraviolet radiation. Further details concerning free radical thermal and photopolymerization techniques may be found in, for example, U.S. Pat. No. 4,654,233 (Grant et al.); U.S. Pat. No. 4,855,184 (Klun et al.); and U.S. Pat. No. 6,224,949 (Wright et al.). Useful free-radical thermal initiators include, for example, azo, peroxide, persulfate, and redox initiators, and combinations thereof.

Useful free-radical photoinitiators include, for example, those known as useful in the UV cure of acrylate polymers such as described in WO2006/102383.

The polymerizable composition for use as the surface layer or an underlying hardcoat layer preferably contains surface modified inorganic particles that add mechanical strength and durability to the resultant coating.

A variety of inorganic oxide particles can be used in the hardcoat. The inorganic oxide particles can consist essentially of or consist of a single oxide such as silica, or can comprise a combination of oxides, such as silica and aluminum oxide, or a core of an oxide of one type (or a core of a material other than a metal oxide) on which is deposited an oxide of another type. Silica is a common inorganic particle. The inorganic oxide particles are often provided in the form of a sol containing a colloidal dispersion of inorganic oxide particles in liquid media. The sol can be prepared using a variety of techniques and in a variety of forms including hydrosols (where water serves as the liquid medium), organosols (where organic liquids so serve), and mixed sols (where the liquid medium contains both water and an organic liquid), e.g., as described in U.S. Pat. No. 5,648,407 (Goetz et al.); U.S. Pat. No. 5,677,050 (Bilkadi et al.) and U.S. Pat. No. 6,299,799 (Craig et al.). Aqueous sols (e.g. of amorphous silica) can be employed. Sols generally contain at least 2 wt-%, at least 10 wt-%, at least 15 wt-%, at least 25 wt-%, and often at least 35 wt-% colloidal inorganic oxide particles based on the total weight of the sol. The amount of colloidal inorganic oxide particle is typically no more than 50 wt-% (e.g. 45 wt-%). The surface of the inorganic particles can be "acrylate functionalized" as described in Bilkadi et al. The sols can also be matched to the pH of the binder, and can contain counter ions or water-soluble compounds (e.g., sodium aluminate), all as described in Kang et al. '798.

Various high refractive index inorganic oxide particles can be employed such as for example zirconia ("$ZrO_2$"), titania ("$TiO_2$"), antimony oxides, alumina, tin oxides, alone or in combination. Mixed metal oxide may also be employed. Zirconias for use in the high refractive index layer are available from Nalco Chemical Co. under the trade designation "Nalco OOSSOO8" and from Buhler AG Uzwil, Switzerland under the trade designation "Buhler zirconia Z—WO sol". Zirconia nanoparticle can also be prepared such as described in U.S. Pat. Nos. 7,241,437 and 6,376,590.

The inorganic nanoparticles are preferably treated with a surface treatment agent. Surface-treating the nano-sized particles can provide a stable dispersion in the polymeric resin. Preferably, the surface-treatment stabilizes the nanoparticles so that the particles will be well dispersed in the polymerizable resin and results in a substantially homogeneous composition. Furthermore, the nanoparticles can be modified over at least a portion of its surface with a surface treatment agent so that the stabilized particle can copolymerize or react with the polymerizable resin during curing. The incorporation of surface modified inorganic particles is amenable to covalent bonding of the particles to the free-radically polymerizable organic components, thereby providing a tougher and more homogeneous polymer/particle network.

In general, a surface treatment agent has a first end that will attach to the particle surface (covalently, ionically or through strong physisorption) and a second end that imparts compatibility of the particle with the resin and/or reacts with resin during curing. Examples of surface treatment agents include alcohols, amines, carboxylic acids, sulfonic acids, phosphonic acids, silanes and titanates. The preferred type of treatment agent is determined, in part, by the chemical nature of the metal oxide surface. Silanes are preferred for silica and other for siliceous fillers. Silanes and carboxylic acids are preferred for metal oxides such as zirconia. The surface modification can be done either subsequent to mixing with the monomers or after mixing. It is preferred in the case of silanes to react the silanes with the particle or nanoparticle surface before incorporation into the resin. The required amount of surface modifier is dependant upon several factors such as particle size, particle type, modifier molecular wt, and modifier type. In general, it is preferred that approximately a monolayer of modifier is attached to the surface of the particle. The attachment procedure or reaction conditions required also depend on the surface modifier used. For silanes it is preferred to surface treat at elevated temperatures under acidic or basic conditions for from 1-24 hr approximately. Surface treatment agents such as carboxylic acids may not require elevated temperatures or extended time.

Representative embodiments of surface treatment agents suitable for the compositions include compounds such as, for example, isooctyl trimethoxy-silane, N-(3-triethoxysilylpropyl)methoxyethoxyethoxyethyl carbamate, N-(3-triethoxysilylpropyl)methoxyethoxyethoxyethyl carbamate, 3-(methacryloyloxy)propyltrimethoxysilane, 3-acryloxypropyltrimethoxysilane, 3-(methacryloyloxy)propyltriethoxysilane, 3-(methacryloyloxy)propylmethyldimethoxysilane, 3-(acryloyloxypropyl)methyldimethoxysilane, 3-(methacryloyloxy)propyldimethylethoxysilane, 3-(methacryloyloxy)propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltri-isopropenoxysilane, vinyltris(2-methoxyethoxy)silane, styrylethyltrimethoxysilane, mercaptopropyltrimethoxysilane, 3-glycidoxypropyltrimethoxysilane, acrylic acid, methacrylic acid, oleic acid, stearic acid, dodecanoic acid, 2-[2-(2-methoxyethoxy)ethoxy]acetic acid (MEEAA), beta-carboxyethylacrylate (BCEA), 2-(2-methoxyethoxy)acetic acid, methoxyphenyl acetic acid, and mixtures thereof.

The surface modification of the particles in the colloidal dispersion can be accomplished in a variety known ways, such as described in U.S. Pat. Nos. 7,241,437 and 6,376,590.

A combination of surface modifying agents can be useful, wherein at least one of the agents has a functional group co-polymerizable with a hardenable resin. Combinations of surface modifying agent can result in lower viscosity. For example, the polymerizing group can be ethylenically unsaturated or a cyclic function subject to ring opening polymerization. An ethylenically unsaturated polymerizing group can be, for example, an acrylate or methacrylate, or vinyl group. A cyclic functional group subject to ring opening polymerization generally contains a heteroatom such as oxygen, sulfur or nitrogen, and preferably a 3-membered ring containing oxygen such as an epoxide.

A preferred combination of surface modifying agent includes at least one surface modifying agent having a functional group that is copolymerizable with the organic component of the polymerizable resin and a second amphiphilic modifying agent, such as a polyether silane, that may act as a dispersant. The second modifying agent is preferably a polyalkyleneoxide containing modifying agent that is optionally co-polymerizable with the organic component of the polymerizable composition.

Surface modified colloidal nanoparticles can be substantially fully condensed. Non-silica containing fully condensed nanoparticles typically have a degree of crystallinity (measured as isolated metal oxide particles) greater than 55%, preferably greater than 60%, and more preferably greater than 70%. For example, the degree of crystallinity can range up to about 86% or greater. The degree of crystallinity can be determined by X-ray diffraction techniques. Condensed crystalline (e.g. zirconia) nanoparticles have a high refractive index whereas amorphous nanoparticles typically have a lower refractive index.

The inorganic particles preferably have a substantially monodisperse size distribution or a polymodal distribution obtained by blending two or more substantially monodisperse distributions. Alternatively, the inorganic particles can be introduced having a range of particle sizes obtained by grinding the particles to a desired size range. The inorganic oxide particles are typically non-aggregated (substantially discrete), as aggregation can result in optical scattering (haze) or precipitation of the inorganic oxide particles or gelation. The inorganic oxide particles are typically colloidal in size, having an average particle diameter of 5 nanometers to 100 nanometers. The particle size of the high index inorganic particles is preferably less than about 50 nm in order to provide sufficiently transparent high-refractive index coatings. The average particle size of the inorganic oxide particles can be measured using transmission electron microscopy to count the number of inorganic oxide particles of a given diameter.

The optical film having a surface layer of the cured coating as described herein may have a gloss or matte surface. Matte films typically have lower transmission and higher haze values than typical gloss films. Whereas gloss surfaces typically have a gloss of at least 130 as measured according to ASTM D 2457-03 at 60°; matte surfaces have a gloss of less than 120. In some embodiments, the haze is less than 5%, or 2.5%, or 1% depending on the intended end use as measured according to ASTM D1003.

A particulate matting agent can be incorporated into the polymerizable composition in order to impart anti-glare properties to the surface layer as described in WO 2008/067262. The particulate matting agent can prevent uneven coloration caused by interference with an associated hard coat layer. One commercially available silica particulate matting agent having an average particle size of 3.5 microns is commercially available from W.R. Grace and Co., Columbia, Md. under the trade designation "Syloid C803".

The coating composition may optionally comprise and antistatic agent as described in WO 2008/067262. Various antistatic particles are commercially available as water-based and solvent-based The non-ionic surfactant, additive when present, and hardcoat composition can be dispersed in a solvent to form a dilute coating composition. The amount of solids in the coating composition is typically at least 20 wt-% and usually no greater than about 75 wt-%. For some optical substrate such as polycarbonate, acrylic, cellulose acetate, and cellulose triacetate, it is preferred to employ an alcohol based solvent including for example methanol, ethyl alcohol, isopropyl alcohol, propanol, etc. as well as glycol ethers such as propylene glycol monomethyl ether or ethylene glycol monomethyl ether, etc. For such optical substrates, the coating compositions may contain predominantly alcohol solvent(s). For other uses, however, alcohol based solvent(s) may be combined with other (i.e. non-alcohol) solvents.

Thin coating layers can be applied to the optical substrate using a variety of techniques, including dip coating, forward and reverse roll coating, wire wound rod coating, and die coating. Die coaters include knife coaters, slot coaters, slide coaters, fluid bearing coaters, slide curtain coaters, drop die curtain coaters, and extrusion coaters among others. Many types of die coaters are described in the literature such as by Edward Cohen and Edgar Gutoff, Modern Coating and Drying Technology, VCH Publishers, NY 1992, ISBN 3-527-28246-7 and Gutoff and Cohen, Coating and Drying Defects: Troubleshooting Operating Problems, Wiley Interscience, NY ISBN 0-471-59810-0.

A die coater generally refers to an apparatus that utilizes a first die block and a second die block to form a manifold cavity and a die slot. The coating fluid, under pressure, flows through the manifold cavity and out the coating slot to form a ribbon of coating material. Coatings can be applied as a single layer or as two or more superimposed layers. Although it is usually convenient for the substrate to be in the form of a continuous web, the substrate may also be a succession of discrete sheets.

Any surface that is routinely touched could benefit from the coating composition described herein. Examples include optical displays (e.g., television screens, computer screens, cell phone screens, console displays in automobiles), optical films (e.g., screen protectors, privacy films), automobile windows, consumer appliances (e.g., stove top, outer surfaces of refrigerator), etc.

The term "optical display", or "display panel", can refer to any conventional optical displays, including but not limited to multi-character multi-line displays such as liquid crystal displays ("LCDs"), plasma displays, front and rear projection displays, cathode ray tubes ("CRTs"), and signage, as well as single-character or binary displays such as light emitting diodes ("LEDs"), signal lamps, and switches. The exposed surface of such display panels may be referred to as a "lens." The invention is particularly useful for displays having a viewing surface that is susceptible to being touched or contacted by ink pens, markers and other marking devices, wiping cloths, paper items and the like.

The coatings of the invention can be employed in a variety of portable and non-portable information display articles. These articles include PDAs, cell phones (including combination PDA/cell phones), LCD televisions (direct lit and edge lit), touch sensitive screens, wrist watches, car navigation systems, global positioning systems, depth finders, calculators, electronic books, CD and DVD players, projection television screens, computer monitors, notebook computer displays, instrument gauges, instrument panel covers, signage such as graphic displays and the like. The viewing surfaces can have any conventional size and shape and can be planar or non-planar, although flat panel displays are preferred. The coating composition or coated film, can be employed on a variety of other articles as well such as for example camera lenses, eyeglass lenses, binocular lenses, mirrors, retroreflective sheeting, automobile windows, building windows, train windows, boat windows, aircraft windows, vehicle headlamps and taillights, display cases, road pavement markers (e.g. raised) and pavement marking tapes, overhead projectors, stereo cabinet doors, stereo covers, watch covers, as well as optical and magneto-optical recording disks, and the like.

A variety of substrates can be utilized in the articles of the invention. Suitable substrate materials include glass as well as thermosetting or thermoplastic polymers such as polycarbonate, poly(meth)acrylate (e.g., polymethyl methacrylate or "PMMA"), polyolefins (e.g., polypropylene or "PP"), polyurethane, polyesters (e.g., polyethylene terephthalate or "PET"), polyamides, polyimides, phenolic resins, cellulose diacetate, cellulose triacetate, polystyrene, styrene-acrylonitrile copolymers, epoxies, and the like.

Such substrates are typically non-absorbent with respect to both aqueous solutions and oils.

Typically the substrate will be chosen based in part on the desired optical and mechanical properties for the intended use. Such mechanical properties typically will include flexibility, dimensional stability and impact resistance. The substrate thickness typically also will depend on the intended use. For most applications, a substrate thickness of less than about 0.5 mm is preferred, and is more preferably about 0.02 to about 0.2 mm. Self-supporting polymeric films are preferred. Films made from polyesters such as PET or polyolefins such as PP (polypropylene), PE (polyethylene) and PVC (polyvinyl chloride) are particularly preferred. The polymeric material can be formed into a film using conventional film-making techniques such as by extrusion and optional uniaxial or biaxial orientation of the extruded film. The substrate can be treated to improve adhesion between the substrate and the hardcoat layer, e.g., chemical treatment, corona treatment such as air or nitrogen corona, plasma, flame, or actinic radiation. If desired, an optional tie layer or primer can be applied to the substrate and/or hardcoat layer to increase the interlayer adhesion.

Various light transmissive optical films are known including but not limited to, multilayer optical films, microstructured films such as retroreflective sheeting and brightness enhancing films, (e.g. reflective or absorbing) polarizing films, diffusive films, as well as (e.g. biaxial) retarder films and compensator films such as described in U.S. Patent Application Publication No. 2004/0184150.

As described is U.S. Patent Application Publication 2003/0217806, multilayer optical films provide desirable transmission and/or reflection properties at least partially by an arrangement of microlayers of differing refractive index. The microlayers have different refractive index characteristics so that some light is reflected at interfaces between adjacent microlayers. The microlayers are sufficiently thin so that light reflected at a plurality of the interfaces undergoes constructive or destructive interference in order to give the film body the desired reflective or transmissive properties. For optical films designed to reflect light at ultraviolet, visible, or near-infrared wavelengths, each microlayer generally has an optical thickness (i.e., a physical thickness multiplied by refractive index) of less than about 1 µm. However, thicker layers can also be included, such as skin layers at the outer surfaces of the film, or protective boundary layers disposed within the film that separate packets of microlayers. Multilayer optical film bodies can also comprise one or more thick adhesive layers to bond two or more sheets of multilayer optical film in a laminate.

Further details concerning multilayer optical films and related constructions can be found in U.S. Pat. No. 5,882,774 (Jonza et al.), and PCT Publications WO 95/17303 (Ouderkirk et al.) and WO 99/39224 (Ouderkirk et al.). Polymeric multilayer optical films and film bodies can comprise additional layers and coatings selected for their optical, mechanical, and/or chemical properties. See U.S. Pat. No. 6,368,699 (Gilbert et al.). The polymeric films and film bodies can also comprise inorganic layers, such as metal or metal oxide coatings or layers.

Various permanent and removable grade adhesive compositions may be coated on the opposite side (i.e. to the hardcoat) of the substrate so the article can be easily mounted to a display surface. Suitable adhesive compositions include (e.g. hydrogenated) block copolymers such as those commercially available from Kraton Polymers of Westhollow, Tex. under the trade designation "Kraton G-1657", as well as other (e.g. similar) thermoplastic rubbers. Other exemplary adhesives include acrylic-based, urethane-based, silicone-based, and epoxy-based adhesives. Preferred adhesives are of sufficient optical quality and light stability such that the adhesive does not yellow with time or upon weather exposure so as to degrade the viewing quality of the optical display. The adhesive can be applied using a variety of known coating techniques such as transfer coating, knife coating, spin coating, die coating and the like. Exemplary adhesives are described in U.S. Patent Application Publication No. 2003/0012936. Several of such adhesives are commercially available from 3M Company, St. Paul, Minn. under the trade designations 8141, 8142, and 8161.

The visibility of a fingerprint initially or as a function of time can be determined by various methods. Preferably, however, such assessment is made using a reproducible standardized method. One method of determining the fingerprint visibility of a coating composition comprises providing a coating composition on a substrate, applying a simulated fingerprint composition onto the coated substrate, and measuring an optical property of the simulated fingerprint composition on the coated substrate. If the measured optical property is for example transmission or haze, the substrate to which the coating composition is applied is a light-transmissible (e.g. transparent) substrate. However, if the optical property is for example gloss, the substrate may alternatively be an opaque substrate.

The simulated fingerprint composition is generally a highly lipophilic substance. The simulated fingerprint composition is typically a mixture of a fatty substance that is predominantly a solid at ambient temperature (25° C.) and an oily substance that is predominantly a liquid at ambient temperature (25° C.). Vegetable shortening is a suitable solid; whereas a fatty alkyl oxide wherein the alkyl group has at least 24 carbon atoms, such as available from Sigma under the trade designation "Triolein", is a suitable liquid. The simulated fingerprint may be applied to the (i.e. cured) coating using a variety of techniques. The oily substance may be diluted with for example a (e.g. alcohol) solvent in order to reduce the viscosity and evenly apply a thin coating (e.g. a thickness of 1.2 microns). A rubber stopper can conveniently be used to provide a continuous coating. However, other rubber stamp designs, or a sandpaper roughened rubber stopper or surface could be utilized to provide a discontinuous coating.

For embodiments wherein the coating composition is a polymerizable composition, the coating composition is cured prior to applying the simulated fingerprint. For embodiments wherein the coating composition comprises a solvent and the coating composition is dried prior to applying the simulated fingerprint.

The optical property, such as haze may be measured initially and after a duration of time. The duration of time may be 1, 2, 3, 4, or 5 minutes or longer durations of times, such as 20 minutes. One suitable method for determining fingerprint visibility is described in greater detail in the forthcoming examples.

By comparing the initial (e.g. simulated) fingerprint visibility to the visibility after a duration of time (e.g. 20 minutes), one can calculated a ratio by dividing the visibility after a duration of time by the initial visibility. When the ratio is 1, there is no change in the visibility of a (e.g. simulated) fingerprint as a function of time. As the ratio, becomes smaller, the change is visibility become greater. In some embodiments, the cured coating described herein exhibits a ratio of initial simulated fingerprint visibility to simulated fingerprint visibility (e.g. at 20 minutes) of less than 0.80, or 0.70, or 0.60, or 0.50.

The visibility of an actual or simulated fingerprint initially or as a function of time can also be determined by use of visible inspection. For example, with reference to FIG. 1A and FIG. 1B, the visibility of a fingerprint can be captured by use of a microscope equipped with a digital camera, using various magnifications. With reference to FIG. 1A, a fingerprint is initially highly visible at a magnification of for example 12×. However, with reference to FIG. 1B, this same fingerprint is substantially less visible after a duration of time (e.g. 5 minutes). With reference to FIG. 2A, at an even high magnification of for example 500×, oil droplets of the fingerprint are initially evident on the cured coating surface. However, with reference to FIG. 2B, these oil droplets are not evident after a duration of time (e.g. 4 minutes), surmised to be absorbed by the cured coating composition.

In favored embodiments described herein, the cured coating maintains its properties and in particular the property of exhibiting reduced fingerprint visibility after aging for 500 hours at 80° C. In some embodiments, the ratio may increase. However, the ratio is still less than 0.80, or 0.70, or 0.60, or 0.50.

GLOSSARY

For the following defined terms, these definitions shall be applied, unless a different definition is given in the claims or elsewhere in the specification.

"Free-radically polymerizable" refers to the ability of monomers, oligomers, polymers or the like to participate in crosslinking reactions upon exposure to a suitable source of free radicals.

"(Meth)acryl" refers to functional groups including acrylates, methacrylates, acrylamides, methacrylamides, alpha-fluoroacrylates, thioacrylates and thio-methacrylates. A preferred (meth)acryl group is acrylate.

"Monovalent perfluoropolyether moiety" refers to a perfluoropolyether chain having one end terminated by a perfluoroalkyl group.

Unless otherwise noted, "HFPO—" refers to the end group $F(CF(CF_3)CF_2O)aCF(CF_3)$— of the methyl ester $F(CF(CF_3)CF_2O)aCF(CF_3)C(O)OCH3$, wherein "a" averages 2 to 15. In some embodiments, a averages between 3 and 10 or a averages between 5 and 8. Such species generally exist as a distribution or mixture of oligomers with a range of values for a, so that the average value of a may be non-integer. In one embodiment a averages 6.2. This methyl ester has an average molecular weight of 1,211 g/mol, and can be prepared according to the method reported in U.S. Pat. No. 3,250,808 (Moore et al.), with purification by fractional distillation.

The recitation of numerical ranges by endpoints includes all numbers subsumed within the range (e.g. the range 1 to 10 includes 1, 1.5, 3.33, and 10).

Objects and advantages of this invention are further illustrated by the following examples, but the particular materials and amounts thereof recited in these examples, as well as other conditions and details, should not be construed to unduly limit this invention.

EXAMPLES

All parts, percentages, ratios, etc. in the examples are by weight, unless noted otherwise. Solvents and other reagents used were obtained from Sigma-Aldrich Chemical Company; Milwaukee, Wis. unless specified differently.

Materials

Non-Ionic Surfactant Component

Brij O2—primary component $C_{18}H_{35}(OCH_2CH_2)_2OH$ (oleyl alcohol with 2 ethyleneoxy groups) obtained from Croda Inc., Edison, N.J.

Brij O3—primary component $C_{18}H_{35}(OCH_2CH_2)_3OH$ (oleyl alcohol with 3 ethyleneoxy groups) reported by the supplier to have an HLB of 6.6.

Synthesis of Non-Ionic Surfactants 2-7

To a 250 ml round bottom flask equipped with an overhead mechanical stirrer, temperature probe and Dean-Stark trap with condenser was added 50 grams (0.177 moles) 90% oleic acid (technical grade), 0.168 moles (0.95 equivalents) of the designated alcohol of the following table, 100 grams cyclohexane, and 1.5 grams para-toluene sulfonic acid. The batch was heated to reflux with moderate agitation to azeotrope off water from the esterification and water was collected in a dean-stark trap. After four hours of reflux, a total of 3 grams of water had been collected and no further water was being produced. Liquid chromatography showed a small amount of residual oleic acid.

The reaction was allowed to cool to room temperature. To the flask a mixture of 60 grams water and 6 grams sodium carbonate was added and 4.5 grams isopropyl alcohol was added. The contents of the flask were mixed well and then allowed to phase separate in a separatory funnel. The lower aqueous layer was removed. Then a mixture of 70 grams saturated sodium chloride in water was added, the flask shaken, and the contents allowed to separate. The lower aqueous layer was removed. The residual cyclohexane solvent was removed from the ester product using a rotary-evaporator. The yield of light yellow colored product was typically about 86%. Liquid chromatography showed no residual oleic acid.

Properties of the surfactants, including the calculated hydrophilic-lipophilic balance (HLB), are summarized in the following table.

| | Alcohol used | Mw Alcohol | Amount of Alcohol (g) | Ester yield | HLB Surfactant |
|---|---|---|---|---|---|
| Surfactant 2 | Diethylene glycol mono-ethyl ether | 134.17 | 22.56 | 58 g | 4.7 |
| Surfactant 3 | Dipropylene glycol mono-methyl ether | 148.2 | 24.92 | 60 g | 2.8 |

-continued

|  | Alcohol used | Mw Alcohol | Amount of Alcohol (g) | Ester yield | HLB Surfactant |
|---|---|---|---|---|---|
| Surfactant 4 | Triethylene glycol mono-ethyl ether | 178.23 | 29.97 | 63 g | 6.2 |
| Surfactant 5 | Triethylene glycol mono-n-butyl ether | 206.28 | 34.69 | 65 g | 5.1 |
| Surfactant 6 | 1-methoxy-2-propanol | 90.12 | 15.15 | 47 g | 2.0 |
| Surfactant 7 | Ethylene glycol mono-methyl ether | 76.09 | 12.80 | 50 g | 3.1 |

Synthesis of Polymerizable Surfactant (e.g. Brij O2 Acrylate)

To a 1 l round bottom flask equipped with magnetic stirbar and heat-tape wrapped Dean-Stark trap with condenser was added 200 g (0.561 mol) Brij O2, 41.22 g (0.572 mol) acrylic acid, 0.05 g BHT (~500 ppm based on solids), 0.05 g phenothiazine, and 300 g heptane. The reaction was heated in an oil bath. When the internal temperature was about 80° C., 2.96 g (0.0308 mol) methanesulfonic acid was added to the reaction. The oil bath was raised to 120° C., and the heating tape was turned on. After 4 h of refluxing, 10.0 ml of water was collected, the reaction was cooled to 80° C., and 4.69 g (0.0314 mol) triethanolamine was added with stirring to the reaction. After 5 min, 120 g of deionized water was added to the reaction, which was stirred for 1 min, transferred to a separatory funnel, shaken and allowed to settle overnight. Three layers resulted: a clear aqueous layer (84.2 g), and an interphase with a brown gooey mixture (48.7 g), and a top light brown layer. The top layer was isolated and heated in a flask with 120 g of 2% aqueous sodium carbonate to 80° C. T mixture was allowed to settle in the separatory funnel with heating to 75° C. The layers were separated, and the aqueous layer was re-extracted with 50 g of heptane. The combined heptane layers were dried over anhydrous magnesium sulfate, filtered and concentrated on a rotary evaporator to yield 209.7 g (91.1% yield) of a light brown oil, which was characterized by $^1$H NMR. HLB=5.6 (calculated)

Components Comprising Hydrophobic Group (e.g. Non-Ionic Surfactants) Utilized in Synthesis of Additive ALFONIC 810-10—a 50:50 blend of OH—$(CH_2CH_2O)_{10}C_8H_{17}$ and $OH(CH_2CH_2O)_{10}C_{10}H_{21}$ available from Sasol North America, Huston, Tex. HLB=16.2 (calculated)

Brij S20—primary component $C_{18}H_{37}(OCH_2CH_2)_{20}OH$ obtained from Croda Inc., Edison, N.J. Reported by manufacturer to have an HLB=15.3.

Brij O2—primary component $C_{18}H_{35}(OCH_2CH_2)_2OH$ (oleyl alcohol with 2 ethyleneoxy groups) obtained from Croda Inc., Edison, N.J. HLB=5.4 (calculated)

Brij O3—primary component $C_{18}H_{35}(OCH_2CH_2)_3OH$ (oleyl alcohol with 3 ethyleneoxy groups) obtained from Croda Inc., Edison, N.J. HLB=7.0 (calculated)

Emulsogen M-A—oleyl alcohol with 5 ethyleneoxide units and available from Clariant Corp., Charlotte, N.C. HLB=9.3 (calculated) Mw=489 g/mole ISOFOL C16-10—2 hexyl decanol with 10 ethyleneoxide units available from Sasol North America, Huston, Tex. HLB=13.3 (calculated)

ISOFOL C16-20—2 hexyl decanol with 20 ethyleneoxide units. HLB=16.4 (calculated)

Polyoxyl 50 stearate—stearyl (octadecanol) alcohol with 50 ethyleneoxide units available from Spectrum Chemical Manufacturing Corp., Gardena, Calif. HLB=18.8 (calculated)

Emalex HC-20 is a castor oil with 20 ethyleneoxide units available from Ikeda Corporation of America, Island Park, N.Y. Reported by manufacturer to have an HLB=9.

Oleyl alcohol—Super Refined™ Novol NF obtained from Croda Inc., Edison, N.J. HLB=1.1 (calculated)

| Hexyl alcohol | HLB = 4.9 (calculated) |
|---|---|
| Stearyl Alcohol | HLB = 1.0 (calculated) |
| Dodecyl alcohol | HLB = 2.1 (calculated) |

MPEG 750—a 750 molecular weight methoxy terminated ethyleneoxide alcohol available from Dow Chemical, Midland, Mich.

Components Comprising Low Surface Energy Silicone Group

MCR-C12—Monocarbinol terminated poly(dimethylsiloxane) of 1000 MW from Gelest, Morrisville, Pa.

MCR-C18—Monocarbinol terminated poly(dimethylsiloxane) of 5000 MW from Gelest, Morrisville, Pa.

Component Comprising Low Surface Energy Perfluoroalkyl Group

MeFBSEA—$C_4F_9SO_2N(CH_3)CH_2CH_2OC(O)$ CH=$CH_2$, can be prepared by the general procedure found in U.S. Pat. No. 2,803,613.

Component Comprising Low Surface Energy Perfluoropolyether Group

HFPO—$C(O)N(H)CH_2CH_2OH$ (HFPO amidol) with molecular weight 1344 was made by a procedure similar to that described in U.S. Pat. No. 7,094,829 (Audenaert et al.), the disclosure of which is incorporated herein by reference, for the synthesis of HFPO-oligomer alcohols with the exception that HFPO methyl ester $F(CF(CF_3)CF_2O)_aCF(CF_3)C(O)CH_3$ with a=6.2 was replaced with $F(CF(CF_3)CF_2O)_aCF(CF_3)C(O)OCH_3$ where a=6.85. The HFPO methyl ester was prepared according to the method reported in U.S. Pat. No. 3,250,808 (Moore et al.), the disclosure of which is incorporated herein by reference, with purification by fractional distillation.

Other Components

Isocyanatoethyl acrylate (IEA) was obtained from CBC America Corp, Commack, N.Y.

Nalco 2327—an aqueous dispersion of 20 nm silica nanoparticles (41% solids in water, stabilized with ammonia) obtained from Nalco Chem. Co. Naperville, Ill.

PROSTAB 5198—4-hydroxy-2,2,6,6-tetramethyl-1-piperidinyloxy (commonly referred to as 4-hydroxy-TEMPO) obtained from CIBA Specialty Chemicals, Tarrytown, N.Y.

Sartomer SR444C—pentaerythritol triacrylate (PET3A) obtained from Sartomer Company, Exton, Pa.

Sartomer SR444—pentaerythritol triacrylate (PET3/4) obtained from Sartomer Company, Exton, Pa.

Beamset 575CB—a urethane photooligomer available from Arakawa Chemical (USA), Chicago, Ill.

BHT—2,6-di-t-butyl-4-methylphenol obtained from Sigma Aldrich, Milwaukee, Wis.

Esacure 1—2-hydroxy-1-{1-[4-(2-hydroxy-2-methyl-propionyl)-phenyl]-1,3,3-trimethyl-indan-5-yl}-2-methyl-propan-1-one from Lamberti SPA, Gallarate, Italy VAZO 52 & VAZO 67—Polymerization initiators obtained from E.I. du Pont de Nemours and Company, Wilmington, Del.

Des N100—Polyisocyanate Desmodur™ (Des) N100 obtained from Bayer Polymers LLC, of Pittsburgh, Pa.

DBTDL—Dibutyltin dilaurate obtained from Sigma Aldrich, Milwaukee, Wis.

DuPont Teijin PET: Polyethylene terephthalate film 618-500 obtained from DuPont Teijin Films U.S. Limited Partnership, Hopewell, Va.

Phenothiazine, stearyl alcohol, dodecyl alcohol, ethyl acetate, ethanol, isopropyl alcohol, triethanolamine, thioethanol and hexyl alcohol were obtained from Sigma-Aldrich, Milwaukee, Wis.

Surface Modified Nanosilica Dispersion 305 grams of Nalco 2327 was added to a 1-liter reaction flask. 486 grams of 1-methoxy-2-propanol was added to the reactor with stirring. 19.38 grams of 3-methacryloxypropyl-trimethoxysilane was added slowly to the reactor with stirring. 0.15 grams of a 5% aqueous of PROSTAB 5198 was added to the reactor with stirring. The mixture was stirred 18 hours at 90° C.

The reaction mixture was heated under vacuum and the 1-methoxy-2-propanol/water azeotrope was distilled off with any necessary addition of 1-methoxy-2-propanol to remove substantially all of the water. The surface modification reaction resulted in a mixture containing 40% surface modified silica (20 nm average particle size), by weight, in 1-methoxy-2-propanol.

Synthesis of Additives (e.g. Perfluoropolyether Urethane Multiacrylates)

A solution of Des N100/0.25 HFPO/0.25 $C_{18}H_{37}(OCH_2CH_2)_{20}OH$/0.55 PET3A was prepared as follows. A 200 ml roundbottom flask equipped with magnetic stir bar was charged with 6.25 g (0.03272 eq, 191 EW) Des N100, 29.8 g methyl ethyl ketone (MEK). The reaction was swirled to dissolve the reactant, the flask was placed in a oil bath at 55 degrees Celsius, and fitted with a condenser under dry air. Twenty-two microliters of a 10% dibutyltin dilaurate (DBTDL) solution in MEK was added to the reaction (50 ppm based on total solids). Over about 20 min, 10.99 g (0.008184 eq, 0.25 equivalent fraction with respect to the Des N100, 1344 EW) $F(CF(CF_3)CF_2O)_{6.85}CF(CF_3)C(O)NHCH_2CH_2OH$ was added to the reaction via addition funnel Two hours after the addition was complete, 8.66 g (0.008184 eq, 0.25 equivalent fraction with respect to the Des N100, 1058.5 EW) $C_{18}H_{37}(OCH_2CH_2)_{20}OH$ (Brij S20) was added over 20 min, followed by rinsing of the addition funnel with 5.0 g MEK. After reaction overnight, the following afternoon, 0.013 g BHT, followed by 8.90 g (0.018 eq, 0.55 equivalent fraction with respect to the Des N100, at 494.3 EW) Sartomer SR444C (PET3A), was added in one portion to the reaction which was allowed to proceed overnight. (The actual OH equivalent weight of the SR444C was 421.8, but 494.3 was used in calculations for all lots of SR444C, so that for any given material made, the weight percentage of SR444C remained constant). The reaction was monitored by FTIR and initially showed an isocyanate group absorption at 2273 $cm^{-1}$. This absorption was gone after reaction overnight, and 1.41 g of MEK was added to compensate for MEK lost during the reaction to adjust the final solids to 50% solids. This additive is identified as Additive 5 in Table A.

Other perfluoropolyether urethane multiacrylates were prepared similarly. The materials were run at 50% solids in MEK (unless noted) with catalysis by 50-500 ppm DBTDL. The relative mole fraction of DES N100 used is 1.0, and the relative mole fractions of the alcohols are given by the numbers before the component in the formulation, as described in Table A. For example, Additive 5 is "Des N100/0.25 HFPO—C(O)NH—CH2CH2OH/0.25 Brij S20/0.55 PET3A", which means for each mole of DES N100, the additive contained 0.25 mole-% of HFPO—C(O)NH—CH2CH2OH, 0.25 mole-% of BrijS20 and 0.55 mole-% of PETA3A.

Additives 15-16—Synthesis of Additives Comprising Silicone Group

The monocarbinal terminated poly(dimethylsiloxane) components were each utilized to make an additive in the same manner as Additives 1-14. The relative mole fractions of these additives were as follows:

| 15. | Des N100/0.25 MCR-C12/0.25 BrijS20/0.55 PET3A |
| 16. | Des N100/0.25 MCR-C18/0.25 BrijS20/0.55 PET3A |

Additive 17—Synthesis of $(MeFBSEA)_4SCH_2CH_2OH$ Oligomer (FC-Oligomer):

4 mol parts of MeFBSEA and 1 mol part of thioethanol at 50% solids in methyl isobutyl ketone were purged with nitrogen for about 5 min, followed by a charge of about 0.5% by weight of VAZO 67, followed by heating at 65° C., for about 15 h. This FC-oligomer was then used to make an additive in the same manner as Additives 1-14.

TABLE A

| Additive Number | Formulation |
|---|---|
| 1. | Des N100/0.15 HFPO-C(O)NH—$CH_2CH_2OH$/0.15 Brij S20/0.75 PET3A |
| 2. | Des N100/0.20 HFPO-C(O)NH—$CH_2CH_2OH$/0.30 MPEG 750/0.55 PET3A (Comparative Additive Lacking Hydrophobic group) |
| 3. | Des N100/0.25 HFPO-C(O)NH—$CH_2CH_2OH$/0.35 Brij S20/0.45 PET3A |
| 4. | Des N100/0.30 HFPO-C(O)NH—$CH_2CH_2OH$/0.20 Brij S20/0.55 PET3A |
| 5. | Des N100/0.25 HFPO-C(O)NH—$CH_2CH_2OH$/0.25 Brij S20/0.55 PET3A |
| 6. | Des N100/0.25 HFPO-C(O)NH—$CH_2CH_2OH$/0.125 Polyoxyl 50 stearate/0.675 PET3A |
| 7. | Des N100/0.25 HFPO-C(O)NH—$CH_2CH_2OH$/0.25 ISOFOL C16-10/0.55 PET3A |
| 8. | Des N100/0.25 HFPO-C(O)NH—$CH_2CH_2OH$/0.25 ISOFOL C16-20/0.55 PET3A |
| 9. | Des N100/0.25 HFPO-C(O)NH—$CH_2CH_2OH$/0.25 ALFONIC 810-10/0.55 PET3A |
| 10. | Des N100/0.25 HFPO-C(O)NH—$CH_2CH_2OH$/0.25 Stearyl alcohol/0.55 PET3A |
| 11. | Des N100/0.25 HFPO-C(O)NH—$CH_2CH_2OH$/0.25 Dodecyl alcohol/0.55 PET3A |
| 12. | Des N100/0.25 HFPO-C(O)NH—$CH_2CH_2OH$/0.25 Hexyl alcohol/0.55 PET3A |
| 13. | Des N100/0.25 HFPO-C(O)NH—$CH_2CH_2OH$/0.25 Emulsogen M-A/0.55 PET3A |
| 14. | Des N100/0.25 HFPO-C(O)NH—$CH_2CH_2OH$/0.25 Oleyl alcohol/0.55 PET3A |

The weight of solids in grams of the components used in the synthesis of the additives of Table A are described as follows:

| Additive Number | Wt Des N100 | Wt. HFPO amidol (unless otherwise noted) | Wt. Named alcohol (e.g. Brij S20 for Additive No. 1) | Wt PET3A |
|---|---|---|---|---|
| 1. | 6.25 | 6.59 | 5.19 | 12.13 |
| 2. | 6.25 | 8.80 | 7.36 | 8.9 |
| 3. | 6.25 | 10.99 | 12.12 | 7.28 |
| 4. | 6.25 | 13.19 | 6.93 | 8.9 |
| 5. | 6.25 | 10.99 | 8.66 | 8.9 |
| 6. | 6.12 | 10.77 | 9.91 | 10.69 |
| 7. | 6.25 | 10.99 | 5.65 | 8.9 |
| 8. | 6.25 | 10.99 | 9.06 | 8.9 |
| 9. | 6.25 | 10.99 | 4.75 | 8.9 |
| 10. | 6.25 | 10.99 | 2.21 | 8.9 |
| 11. | 6.25 | 10.99 | 1.52 | 8.9 |
| 12. | 6.25 | 10.99 | 0.84 | 8.90 |
| 13. | 6.25 | 10.99 | 4.0 | 8.9 |
| 14. | 6.25 | 10.99 | 2.2 | 8.9 |
| 15. | 6.25 | MCR-C12 - 8.18 g | 8.66 | 8.9 |
| 16. | 6.25 | MCR-C18 - 16.36 g | 8.66 | 8.9 |
| 17. | 6.25 | FC-oligomer - 14.10 g | 8.66 | 8.9 |

Preparatory Materials for Additives 18-20
Preparation of HFPO-IEA Urethane Adduct To 200 mL roundbottom equipped with a magnetic stir bar was charged 100.00 g (0.0744 mol) of HFPO amidol, MW 1344, 10.5 g (0.0744 mol) isocyanatoethyl acrylate (IEA), 0.0553 g dibutyltin dilaurate (DBTDL, 650 microliters of a 10% solids solution of DBTDL in methyl ethyl ketone), 110.50 g ethyl acetate, and 0.0553 g, 500 ppm, of BHT. After reaction under dry air at 60 C overnight, analysis by FTIR showed no residual isocyanate peak. The reaction was adjusted to 50% solids with ethyl acetate.

Preparation of Dodecanol-IEA Urethane Adduct

In a manner similar to the Preparation of HFPO-IEA urethane adduct, 186.33 g (0.26834 mol) of dodecanol, 37.87 g (0.26834 mol) isocyanatoethyl acrylate, 0.0439 g dibutyltin dilaurate (DBTDL, 517 microliters of a 10% solids solution of DBTDL in methyl ethyl ketone), 87.87 g ethyl acetate, and 0.0439 g, 500 ppm of BHT, were combined and reacted to provide the dodecanol-IEA urethane adduct at 50% solids in ethyl acetate.

Preparation of Brij S20-IEA Urethane Adduct

In a manner similar to the Preparation of HFPO-IEA urethane adduct, 100.00 g (0.094473 mol) of Brij S20, 13.33 g (0.094473 mol) isocyanatoethyl acrylate, 0.0567 g dibutyltin dilaurate (DBTDL, 666 microliters of a 10% solids solution of DBTDL in methyl ethyl ketone), 113.33 g ethyl acetate, and 0.0567 g, 500 ppm of BHT, were combined and reacted to provide the Brij S20-IEA urethane adduct at 50% solids in ethyl acetate.

Additives 18-20—Synthesis of Acrylate Copolymer Additives

A 250 mL bottle was charged with the indicated grams of 50% solids solutions in ethyl acetate of the HFPO-IEA, Dodecanol-IEA, and Brij S20-IEA urethane adducts as shown in the following Table. For the examples indicated, a 50% solids solution of hydroxyethyl acrylate was also added. Next, 100% solids Vazo 67 and dodecane thiol were charged to the bottles in the gram amounts indicated. The reactions were purged for 1 min with nitrogen gas, then placed in a Launder-Ometer with the water bath at 65° C. for 24 h. For those additives (19 and 20) containing hydroxyethyl acrylate, 10 g of ethyl acetate was added to each, along with a stirbar, and the indicated gram amount of 50% solids in ethyl acetate of isocyanatoethyl acrylate (equimolar with respect to the hydroxyethyl acrylate) was added. The bottles were each placed in an oil bath at 60° C., and allowed to react with stirring for 3.5 h at temperature, and then for an additional 52 hours as the oil bath cooled to ambient temperature. An FTIR of the reactions for Additives 19 and 20 showed no isocyanate peak at 2265 cm$^{-1}$. The Additives 19 and 20 were then adjusted to 45% solids using 5.13 g and 6.1 g of ethyl acetate, respectively.

| Additive | Dodecanol-IEA | HFPO-IEA | Brij 20-IEA | HEA | Vazo 67 | Dodecane thiol | IEA |
|---|---|---|---|---|---|---|---|
| 18 | 39.14 | 26.02 | 20.62 | — | 0.21 | 0.21 | — |
| 19 | 40.28 | 31.58 | 24.87 | 1.4 | 0.245 | 0.49 | 1.82 |
| 20 | 33.84 | 31.58 | 25.30 | 2.8 | 0.245 | 049 | 3.64 |

Coating Composition Examples 1-5 and
Comparative Examples A-D

Surface modified nanosilica in Sartomer SR444 was prepared by mixing Sartomer SR444 and the 1-methoxy-2-propanol dispersion of surface modified nanosilica described in "Surface Modified Nanosilica Dispersion" with weight ratios given in following table. The 1-methoxy-2-propanol was then evaporated using a rotary-evaporator. Coating solutions were made by dissolving the materials in ethanol at 70% solids and Additive 5 and the indicated concentration of Brij O2 was added on a phr (parts per hundred resin) basis.

| Material | Solution 1 | Solution 2 |
|---|---|---|
| Surface modified nanosilica | 13.7 | 13.8 |
| SR 444 | 83.6 | 83.8 |
| Additive 5 | 0.3 | 0 |
| Esacure One | 2.4 | 2.4 |

These solutions were coated on a primed 5 mil DuPont Tejin PET film. The coatings were coated at a dry thickness of about 10 microns using a #24 wire round rod. The coatings were dried in an air circulating oven at 105° C. for two minutes. The coatings were then were UV cured using a nitrogen purged Fusion Light Hammer 6 with a 500 watt Fusion H bulb (Fusion UV Systems, Inc., Gaithersburg, Md.) and placed on the conveyer at 30 ft/min.

To test the samples, a background haze was measured using a Haze-Gard plus from BYK-Gardner (Columbia, Md.) then three human fingerprints were applied to the coating and then the haze was again measured using the Haze-Gard plus. This measurement was repeated after 1 and 2 minutes and the results were averaged for all three fingerprints. The fingerprint visibility (FP visibility) was calculated as the difference between the haze measured with the fingerprint and the background haze before the fingerprint was applied. The fingerprint visibility is reported in the following table as a percentage of its initial value. Hence, according to this test when the fingerprint visibility remains 100% after 1 and 2 minutes, the coating has no effect on the fingerprint visibility. In contrast, the lower the fingerprint visibility is after 1 or 2 minutes, the greater effect the coating has on the fingerprint visibility.

| Example No. | Wt-% Brij O2 | Surfactant - Brij O2 (phr) | Solution No. | % FP visibility (remaining haze) 0 min. | % FP visibility 1 min. | % FP visibility 2 min. |
|---|---|---|---|---|---|---|
| Example 1 | 15 | 17.6 | 1 - with additive | 100 | 25 | 17 |
| Example 2 | 13.8 | 16 | 1 - with additive | 100 | 55 | 49 |
| Example 3 | 12.6 | 14.4 | 1 - with additive | 100 | 82 | 82 |
| Example 4 | 11.3 | 12.8 | 1 - with additive | 100 | 91 | 91 |
| Comp. Ex. A | 0 | 0 | 1 - no additive | 100 | 100 | 100 |
| Example 5 | 15 | 17.6 | 2 - no additive | 100 | 79 | 68 |
| Comp. Ex. B | 13.8 | 16 | 2 - no additive | 100 | 100 | 100 |
| Comp. Ex. C | 12.6 | 14.4 | 2 - no additive | 100 | 100 | 100 |
| Comp. Ex. D | 11.3 | 12.8 | 2 - no additive | 100 | 100 | 100 |
| Comp. Ex. E | 0 | 0 | 2 - no additive | 100 | 100 | 100 |

The results show that in the absence of the additive described herein the concentration of this surfactant must exceed 14 wt-% in order to reduce the visibility of the fingerprint. By comparing Examples 1-4 to Comparative Examples B-D, it is evident that lower fingerprint visibility can be achieved with lower concentrations of surfactant by inclusion of the additive. By comparing Example 1 to Example 5, it is evident that the inclusion of the additive provides substantially lower fingerprint visibility at the same surfactant concentration.

Examples 6-34 and Comparative Examples F-K

Coating solutions were made by dissolving the materials listed in the following table in ethanol at 70% solids. These solutions were coated on a primed 5 mil DuPont Tejin PET film. The coatings were coated at a dry thickness of about 15 microns using a #16 wire round rod. The coatings were dried in an air circulating oven at 105° C. for two minutes. The coatings were then were UV cured using a nitrogen purged Fusion Light Hammer® 6 with a 500 watt Fusion H bulb (Fusion UV Systems, Inc., Gaithersburg, Md.) and placed on the conveyer at 40 ft/min.

| Example | Wt % Additive 5 | Surfactant | Wt % Surfactant | Wt % SR 444 | Wt % Silica | Wt % Esacure 1 |
|---|---|---|---|---|---|---|
| Comp. Ex. F | 0.00 | None | 0.0 | 68.0 | 29.4 | 2.6 |
| Comp. Ex. G | 0.13 | None | 0.0 | 68.0 | 29.4 | 2.6 |
| Comp Ex. J | 0.00 | None | 0.0 | 68.9 | 29.5 | 1.57 |
| Comp Ex. K | 0.14 | None | 0.0 | 68.8 | 29.5 | 1.6 |
| Example 6 | 0.13 | Brij O2 | 10.3 | 61.0 | 26.2 | 2.4 |
| Example 7 | 0.12 | Brij O2 | 14.7 | 58.1 | 24.9 | 2.2 |
| Example 8 | 0.12 | Brij O2 | 18.7 | 55.3 | 23.7 | 2.1 |
| Example 9 | 0.11 | Brij O2 | 22.3 | 52.9 | 22.7 | 2.0 |
| Example 10 | 0.12 | Surfactant 2 | 18.7 | 55.3 | 23.7 | 2.1 |
| Example 11 | 0.12 | Surfactant 3 | 18.7 | 55.3 | 23.7 | 2.1 |
| Example 12 | 0.12 | Surfactant 4 | 18.7 | 55.3 | 23.7 | 2.1 |
| Example 13 | 0.12 | Surfactant 5 | 18.7 | 55.3 | 23.7 | 2.1 |
| Example 14 | 0.12 | Surfactant 6 | 18.7 | 55.3 | 23.7 | 2.1 |
| Example 15 | 0.12 | Surfactant 7 | 18.7 | 55.3 | 23.7 | 2.1 |

Comparative Examples H and I were prepared according to Example 1 of U.S. Pat. No. 7,153,563 using 1.5 parts Emalex HC-20 for Comparative H and 10 parts of Emalex HC-20 for Comparative I.

To test the samples, a background haze was measured using a Haze-Gard plus from BYK-Gardner (Columbia, Md.) then a simulated fingerprint was applied to the coating and then the haze was again measured using the Haze-Gard plus. The simulated fingerprint was applied as follows. A solution was prepared by mixing 0.35 parts Crisco Shortening (J.M. Smucker Company, Orrville, Ohio) with 0.35 parts $C_{57}H_{104}O_6$ (obtained from Sigma Chemical Co., St. Louis, Mo. under the trade designation "Triolein" and 8.0 parts isopropyl alcohol. The solution was coated on DuPont Teijin PET film using a #10 wire wound rod which was rapidly pulled across the film. The sample was allowed to dry for 30 min. A #5 stopper (from VWR Scientific) having a bottom outer diameter of about 2.3 cm was attached to a plunger (2.5 pound plunger from Summer Optical, Fort Washington, Pa.). The plunger with stopper was pressed onto the coated PET (inking the stopper). Next the plunger was pressed onto the sample to be tested. The haze of the applied simulated fingerprint was measured immediately and again after 20 minutes. The background haze, the initial haze after applying the simulated fingerprint and the haze 20 minutes after applying the fingerprint are given in the following table. The ratio of the haze after 20 minutes to the initial haze is also given. A Sharpie marker was applied to the surface of the samples and the degree of ink beading was observed visually. Samples where significant ink beading was observed were noted as ink repellant. Results are summarized as follows:

| Example | Haze | 0 min FP | 20 min FP | Ratio | Ink Repellency | HLB of Surfactant |
|---|---|---|---|---|---|---|
| Comp. Ex. F | 0.4 | 1.5 | 1.5 | 1.00 | no | N/A |
| Comp. Ex. G | 0.4 | 12.6 | 12.4 | 0.98 | yes | N/A |
| Comp Ex. H | 0.4 | 1.8 | 1.9 | 1.05 | no | 9 |
| Comp Ex. I | 0.4 | 2.8 | 2.9 | 1.0 | no | 9 |
| Example 6 | 0.5 | 11.9 | 11.2 | 0.94 | yes | 4.9 |
| Example 7 | 0.8 | 12.1 | 9.5 | 0.79 | yes | 4.9 |
| Example 8 | 1.7 | 12.1 | 7.5 | 0.62 | yes | 4.9 |
| Example 9 | 10.0 | 12.5 | 10.9 | 0.87 | yes | 4.9 |
| Example 10 | 0.4 | 12.3 | 7.2 | 0.59 | yes | 4.7 |
| Example 11 | 0.4 | 12.8 | 9.9 | 0.77 | yes | 2.8 |
| Example 12 | 0.9 | 13.9 | 13.5 | 0.97 | yes | 6.2 |
| Example 13 | 0.8 | 12.6 | 7.4 | 0.59 | yes | 5.1 |
| Example 14 | 0.3 | 12.9 | 11.5 | 0.89 | yes | 2.0 |
| Example 15 | 0.4 | 13.6 | 12.7 | 0.93 | yes | 3.1 |

The results show that the preferred non-ionic surfactant had an HLB below 6.2 and greater than 2.0.

Additional coating composition examples were prepared utilizing the various additives described in Table A.

| Example | Additive No. from Table 1 | Additive | Surfactant | Wt % Surfactant | Wt % SR 444 | Wt % Silica | Wt % Esacure 1 |
|---|---|---|---|---|---|---|---|
| Example 16 | Additive 1 | 0.13 | Brij O2 | 16.8 | 56.7 | 24.3 | 2.0 |
| Example 17 | Additive 2 | 0.13 | Brij O2 | 16.8 | 56.7 | 24.3 | 2.0 |
| Example 18 | Additive 3 | 0.13 | Brij O2 | 16.8 | 56.7 | 24.3 | 2.0 |
| Example 19 | Additive 4 | 0.13 | Brij O2 | 16.8 | 56.7 | 24.3 | 2.0 |
| Example 20 | Additive 6 | 0.13 | Brij O2 | 16.8 | 56.7 | 24.3 | 2.0 |
| Example 21 | Additive 7 | 0.13 | Brij O2 | 16.8 | 56.7 | 24.3 | 2.0 |
| Example 22 | Additive 8 | 0.13 | Brij O2 | 16.8 | 56.7 | 24.3 | 2.0 |
| Example 23 | Additive 9 | 0.13 | Brij O2 | 16.8 | 56.7 | 24.3 | 2.0 |
| Example 24 | Additive 10 | 0.13 | Brij O2 | 16.8 | 56.7 | 24.3 | 2.0 |
| Example 25 | Additive 11 | 0.13 | Brij O2 | 16.8 | 56.7 | 24.3 | 2.0 |
| Example 26 | Additive 12 | 0.13 | Brij O2 | 16.8 | 56.7 | 24.3 | 2.0 |
| Example 27 | Additive 13 | 0.13 | Brij O2 | 16.8 | 56.7 | 24.3 | 2.0 |
| Example 28 | Additive 14 | 0.13 | Brij O2 | 16.8 | 56.7 | 24.3 | 2.0 |
| Example 29 | Additive 5 | 0.13 | Brij O2 | 16.8 | 56.7 | 24.3 | 2.0 |
| Example 30 | Additive 15 | 0.11 | Brij O2 | 16.8 | 56.7 | 24.3 | 2.0 |
| Example 31 | Additive 16 | 0.11 | Brij O2 | 16.8 | 56.7 | 24.3 | 2.0 |
| Example 32 | Additive 17 | 0.11 | Brij O2 | 16.8 | 56.7 | 24.3 | 2.0 |
| Example 33 | Additive 5 | 0.14 | 55.7:7.4:36.9 mixture of Brij O2, Brij O3 and Brij O2 Acrylate | 20.84 | 54.0 | 23.1 | 1.9 |
| Example 34 | Additive 5 | 0.14 | 63.1:36.9 mixture of Surfactant2 and Brij O2 Acrylate | 20.8 | 54.0 | 23.1 | 1.9 |

The simulated fingerprint visibility was tested as described above and the results were as follows.

| Example | | Haze | 0 min FP | 20 min FP | Ratio | Ink Repellency |
|---|---|---|---|---|---|---|
| Example 16 | Additive 1 | 2.1 | 11.4 | 7.7 | 0.67 | yes |
| Example 17 | Additive 2 | 2.1 | 11.3 | 11.0 | 0.97 | yes |
| Example 18 | Additive 3 | 1.8 | 10.2 | 6.8 | 0.67 | yes |
| Example 19 | Additive 4 | 1.9 | 10.9 | 6.5 | 0.60 | yes |
| Example 20 | Additive 6 | 1.7 | 11.5 | 9.2 | 0.80 | yes |
| Example 21 | Additive 7 | 1.7 | 10.9 | 6.7 | 0.61 | yes |
| Example 22 | Additive 8 | 1.52 | 11.2 | 6.8 | 0.61 | yes |
| Example 23 | Additive 9 | 1.67 | 12.3 | 9.2 | 0.75 | yes |
| Example 24 | Additive 10 | 1.51 | 9.7 | 7.2 | 0.74 | yes |
| Example 25 | Additive 11 | 1.16 | 10.3 | 7.1 | 0.69 | yes |
| Example 26 | Additive 12 | 1.09 | 11.9 | 11.1 | 0.93 | yes |
| Example 27 | Additive 13 | 1.22 | 10.6 | 8.7 | 0.82 | yes |
| Example 28 | Additive 14 | 1.08 | 10.7 | 8.2 | 0.77 | yes |
| Example 29 | Additive 5 | 1.13 | 12.5 | 9.1 | 0.73 | yes |
| Example 30 | Additive 15 | 1.0 | 7.5 | 4.0 | 0.53 | Slight |
| Example 31 | Additive 16 | 6.2 | 9.6 | 6.1 | 0.63 | Slight |
| Example 32 | Additive 17 | 0.6 | 7.9 | 3.7 | 0.46 | Slight |
| Example 33 | Additive 5 | 0.3 | 9.4 | 4.5 | 0.47 | Yes |
| Example 34 | Additive 5 | 0.4 | 10.0 | 6.0 | 0.60 | Yes |

All the exemplified additives comprised a perfluoropolyether group except for Examples 30-32. Examples 30-31 demonstrate that the additive may comprise a silicone group instead of a fluorinated group. Example 32 demonstrates that the additive may comprise a perfluoroalkyl group. However, the ink repellency is compromised in Examples 30-32, relative to the additives comprising a perfluoropolyether group.

Examples 17 and 26 exhibit the highest ratio, i.e. the lowest reduction in fingerprint visibility as a function of time. Example 17 contained Additive 2, lacking a hydrophobic group; whereas Example 26 contained Additive 12, having a hexyl group as the hydrophobic group. Hence, a hydrophobic group having greater than 6 carbons can be preferred.

Examples 18-19 and 21-22 exhibit ratios below 0.70 in combination with ink repellency. These examples utilized an additive wherein the hydrophobic group was derived from polyethoxylated alcohols having a high HLB.

Examples 33 and 34 demonstrate that the composition may further comprise a polymerizable non-ionic surfactant. Examples 33 and 34 also demonstrate that a low ratio, i.e. high reduction in fingerprint visibility, can also be achieved with an additive wherein the hydrophobic group was derived from as polyethoxylated alcohol having a low HLB.

The other examples demonstrate that the additive may comprise various hydrophobic groups, optionally in combination with a hydrophilic group such as ethylene oxide repeat units.

Additional examples were prepared comprising a mixture of surfactants as described as follows:

| Example | Additive | Wt % Additive | Surfactant | Wt % Surfactant | Wt % SR 444 | Wt % Silica | Wt % Esacure 1 |
|---|---|---|---|---|---|---|---|
| Comp. Ex. J | NONE | 0 | NONE | 0 | 68.9 | 29.5 | 1.57 |
| Comp. Ex. K | Additive 5 | 0.14 | NONE | 0 | 68.8 | 29.5 | 1.6 |
| Example 35 | NONE | 0 | 84.4:15.6 mixture of Brij O2 and Brij O3 | 18.0 | 56.5 | 24.2 | 1.3 |
| Example 36 | Additive 5 | 0.12 | 88:12 mixture of Brij O2 and Brij O3 | 18.87 | 55.4 | 23.6 | 2.0 |
| Example 37 | Additive 18 | 0.13 | Brij O2 | 16.8 | 56.7 | 24.3 | 2.0 |
| Example 38 | Additive 19 | 0.13 | Brij O2 | 16.8 | 56.7 | 24.3 | 2.0 |
| Example 39 | Additive 20 | 0.13 | Brij O2 | 16.8 | 56.7 | 24.3 | 2.0 |

| Example | | Haze | 0 min FP | 20 min FP | Ratio | Ink Repellency |
|---|---|---|---|---|---|---|
| Example 35 | None | | | | | |
| Example 36 | Additive 5* | | | | | |
| Example 37 | Additive 18 | .9 | 5.1 | 4.2 | .82 | slight |
| Example 38 | Additive 19 | .9 | 8.7 | 7.2 | .83 | slight |
| Example 39 | Additive 20 | .9 | 7.8 | 5 | .65 | slight |
| Example 5* | No Additive | 13 | 4.4 | 3.5 | .83 | No |

*Tested using simulated fingerpint in addition to the human fingerprint test results previously reported.

The receding hexadecane contact angle was measured on some examples. The average value is reported as follows:

| Comp Ex. J | 0 |
|---|---|
| Comp. Ex. K | 55 |
| Example 25 | 57 |
| Example 26 | 59 |
| Example 28 | 58 |
| Example 29 | 55 |
| Example 30 | 22 |
| Example 31 | 32 |
| Example 32 | 48 |
| Example 33 | 57 |
| Example 34 | 58 |
| Example 35 | 0 |
| Example 36 | 45 |

Steel Wool Durability Test and Results

The abrasion resistance of the cured films was tested crossweb to the coating direction by use of a mechanical device capable of oscillating a steel wool sheet adhered to stylus across the film's surface. The stylus oscillated over a 60 mm wide sweep width at a rate of 210 mm/sec (3.5 wipes/sec) wherein a "wipe" is defined as a single travel of 60 mm. The stylus had a flat, cylindrical base geometry with a diameter of 3.2 cm. The stylus was designed for attachment of weights to increase the force exerted by the steel wool normal to the film's surface. The #0000 steel wool sheets were "Magic Sand-Sanding Sheets" available from Hut Products Fulton, Mo. The #0000 has a specified grit equivalency of 600-1200 grit sandpaper. The 3.2 cm steel wool discs were die cut from the sanding sheets and adhered to the 3.2 cm stylus base with 3M Brand Scotch Permanent Adhesive Transfer tape. A single sample was tested for each example, with a 300 g weight and 10 back and forth wipes. The sample was then visually inspected for scratches.

Examples 33-34 and 37-39 were all tested with the steel wool abrasion test and all passed with only very slight scratching.

Sample Formulation 34 was slot-die coated using the following method: The liquid coating composition was coated onto 125 micron gauge (five mil) polyester film using a slot-fed die coater at a wet coating thickness of approximately 23 microns at a web speed of approximately nine meters per minute (30 feet/minute) to provide a dry thickness of 15 microns. The coated web was dried by passing through a gap dryer (as described in U.S. Pat. Nos. 5,581,905; 5,694,701 and 6,134,808) set at approximately 60 degrees C. (residence time in the gap dryer was approximately 20 seconds). Then the web was further dried by passing through a conventional drying oven set at 100 degrees C. (oven residence time was approximately 40 seconds). The coating was cured inline on the polyester web using a Fusion Processor with a 600-watt H bulb (both available from Fusion UV Systems of Gainsburg, Md.).

Aging Test and Results

The simulated fingerprint visibility was measured to give an initial result of 0.56. The coating film was then aged at 80 degrees C. (dry heat, ambient humidity) for 500 hours. The simulated fingerprint visibility was remeasured and found to be 0.64.

Microscopy Images

A human fingerprint was applied to the cured surface of the same sample (i.e. Sample Formulation 34) prepared for the aging test just described. This was immediately placed on the stage of an Olympus MX 50 microscope set at 12× (1.2× objective and 10× multiplier) and the image was captured using an Olympus U-TVo.5 XC-3 camera as depicted in FIG. 1A. A second image was captured 5 minutes later as depicted in FIG. 1B. A second human fingerprint was applied to the same sample except that the microscope was used at 500×, as depicted in FIG. 2A and the second photograph was taken after 4 minutes, as depicted in FIG. 2B. The photographs show the disappearance of the fingerprint with time.

Examples 40-45 and Comparative Examples L & M

Additional samples were prepared TEGO® Rad 2100 (available from Evonik Tego Chemie GmbH, Essen, Germany), HLB=7.03 (calculated) as the additive as described as follows:

| Example | TEGO ® Rad 2100 Additive (parts) | Surfactant | Surfactant (parts) | SR 444 (parts) | Silica (parts) | Esacure 1 (parts) |
|---|---|---|---|---|---|---|
| Example 40 | 0.57 | 63.1:36.9 mixture of Surfactant 2 and Brij O2 Acrylate | 20.7 | 53.6 | 23.0 | 1.9 |
| Example 41 | 0.76 | 63.1:36.9 mixture of Surfactant 2 and Brij O2 Acrylate | 20.7 | 53.6 | 23.0 | 1.9 |
| Example 42 | 0.95 | 63.1:36.9 mixture of Surfactant 2 and Brij O2 Acrylate | 20.7 | 53.6 | 23.0 | 1.9 |
| Example 43 | 1.14 | 63.1:36.9 mixture of Surfactant 2 and Brij O2 Acrylate | 20.7 | 53.6 | 23.0 | 1.9 |
| Example 44 | 1.33 | 63.1:36.9 mixture of Surfactant 2 and Brij O2 Acrylate | 20.7 | 53.6 | 23.0 | 1.9 |
| Example 45 | 1.52 | 63.1:36.9 mixture of Surfactant 2 and Brij O2 Acrylate | 20.7 | 53.6 | 23.0 | 1.9 |

The coating compositions were wire round rod coated (by hand) and cured onto a PET substrate as previously described. Haze, simulated fingerprint visibility, and ink repellency were measured as previously described. These samples were also tested for lint attraction using the following test.

Cellulose Surface Attraction Test—

After the coated and cured film was prepared it was allowed to condition for 24 hours at ambient temperature and 50%+/−10% relative humidity to allow it to be charged. Then 0.35 grams of alpha-cellulose (C-8002) from Sigma Chemical Company (St. Louis, Mo.) was applied to the top of the coating in a 7 cm diameter area. The coated film was tilted back and forth several times to allow the cellulose to evenly coat the 7 cm. diameter test area. The excess cellulose was then shaken off and the haze of the coating and the remaining cellulose was measured according to ASTM D1003.

| Example | Haze | 0 min FP | 20 min FP | Ratio | Cellulose Haze | Ink Repellency |
|---|---|---|---|---|---|---|
| Example 34 | 0.4 | 10.0 | 6.0 | 0.60 | 47 | Yes |
| Example 40 | 0.2 | 13.2 | 8.5 | 0.64 | 14 | Yes |
| Example 41 | 0.2 | 13.2 | 9.0 | 0.68 | 15 | Yes |
| Example 42 | 0.2 | 12.9 | 8.5 | 0.66 | 11 | Yes |
| Example 43 | 0.2 | 14.0 | 9.5 | 0.68 | 14 | Yes |
| Example 44 | 0.5 | 14.3 | 9.9 | 0.69 | 12 | Yes |
| Example 45 | 0.3 | 15.6 | 11.4 | 0.73 | 2 | Yes |

Samples of wire round rod coated and cured coatings of Example 34 and Comparative Examples L and M were further tested to characterize the morphology of the curing coating. Comparative Examples L and M were as follows:

| | Additive | Surfactant | (parts) | | | |
|---|---|---|---|---|---|---|
| Comp. Ex. L | Additive 5-0.09 | 63.1:36.9 mixture of Surfactant2 and Brij O2 Acrylate | 4.5 | 65.1 | 28.1 | 2.2 |
| Comp. Ex. M | Additive 5-0.09 | NONE | 0 | 68.2 | 29.4 | 2.3 |

The haze and simulated fingerprint visibility of Comparative Examples L and M were tested as described above and the results were as follows.

| Example | Haze | 0 min FP | 20 min FP | Ratio |
|---|---|---|---|---|
| Comp. Ex. L | 0.3 | 12.4 | 12.2 | 0.98 |
| Comp. Ex. M | 0.2 | 13 | 12.9 | 0.99 |

Solvent Extraction of Cured Coating

Samples of wire round rod coated Example 34 and Comparative Examples L and M were prepared by cutting the film into small pieces of about 4-20 grams each. The samples were extracted in hexane overnight in a Soxhlet extractor. The films were then dried and the extracted residue was analyzed.

Each of the extracted residues were dissolved with deuterated chloroform and were placed into a NMR tube. A proton NMR spectrum was acquired using a Bruker 500 MHz NMR spectrometer (available from Bruker BioSpin Corporation, Billerica, Mass.). The NMR spectra of the extracts normalized to the residual proteo chloroform peak confirmed that a significantly greater mass of material was extracted from Example 34 as compared to Comparative Examples L and M. The vertical scales for the three spectra were readjusted in order to compare peak shapes and signal frequencies for the purpose of qualitative analysis. The proton NMR spectrum of the residue from Example 34 indicated that the majority (nearly 100%) of the extracted material was Surfactant 2. Proton NMR spectrum of the extract from Comparative Example L suggested that the extracted material contained about 10.6% Surfactant 2. The proton NMR spectrum for the extract from Comparative Example M did not indicate the presence of any Surfactant 2 in the extract from Comparative Example M.

The weight percentage of unpolymerized surfactant (i.e. Surfactant 2) extracted as compared to the weight percentage of unpolymerized surfactant (i.e. Surfactant 2) in the sample prior to extraction was calculated according to the following table.

The isolated coating was then placed in a beaker with hexane and stirred with a magnetic stirrer bar at room temperature for 24 hours. The isolated coating was removed from the beaker and allowed to dry at room temperature.

Gas adsorption analysis was performed on the extracted coating using a Quantachrome Autosorb 1 Analyzer (available from Quantachrome Instruments, Boynton Beach, Fla.). The sample was run using a mixture of nitrogen in helium at partial pressures of 0.01-0.99. The data analysis was performed using the Autosorb 1 Version 1.53 software which determined surface area and pore volume using various thermodynamic models and using a molecular statistics model based on non-localized Density Function Theory. The thermodynamics based models that were used included the Kelvin model, the Brunauer-Emmitt-Teller (BET) model, the Barrett-Joyner-Halenda model, and the Dollimore-Healy model. The thermodynamics based models and the non-localized Density Function Theory model all produced similar

| Coating Composition | (1) Initial Wt. (g) | (2) Extract Wt. (g) | (3) Wt. % Extract of Total | (4) Wt. % Extract of Coating | (5) Wt % Unpolymerized Surfactant of Extract | (6) Wt % Unpolymerized Surfactant in Coating Composition | (7) Wt. % of Extractable Unpolymerized Surfactant |
|---|---|---|---|---|---|---|---|
| Ex. 34. | 6 | 0.0422 | 0.707 | 7.03 | 100 | 13.1 | 53.5 |
| Comp. Ex. L | 3.8 | 0.0005 | 0.013 | 0.13 | 10.6 | 2.84 | 0.47 |
| Comp. Ex. M | 5.7 | 0.0004 | 0.007 | 0.07 | 0.0 | 0 | N/A |

(1) This was the total sample weight of the cured coating and the PET substrate prior to extraction.
(2) This was the mass of the residue after the solvent was evaporated from the extract.
(3) This was calculated by dividing the value of column 2 by the value of column 1 and then multiplying by 100%.
(4) This was calculated by dividing the value of column by the weight ratio of the coating weight to the total coated film weight. This ratio was determined as follows: For Example 34 the weights of the coating and the PET substrate were accurately measured. From this data, the ratio of the coating weight to total coated film weight was determined to be 0.101. For Comparative Examples L and M, the coating thickness was approximately the same as for Example 34, but the density of the coatings differed because these formulations had a higher mass fraction of silica. The ratio of the coating density of Comparative Example L and M to the coating density of Example 34 were estimated by approximating the specific gravity of the organic components of the coatings as being 1.2 and using a specific gravity of silica of 2.65. This resulted in an estimated density for the coating of Comparative Example L being about 3.2% higher than the coating of Example 34 (0.101 + 0.032 × 0.101) and an estimated density for the coating of Comparative Example M being about 4.1% (0.101 + 0.041 × 0.101) higher than the coating of Example 34.
(5) This was determined by NMR as previously described above.
(6) This was the wt-% of Surfactant 2 which was previously reported as (20.8 × 0.631 = 13.1%) for Example 34, (4.5 × 0.631 = 2.84%) for Comparative Example L and zero for Comparative Example M.
(7) This was calculated by multiplying (4) by (5) and dividing by (6).

Three other samples of slot-die coated samples of Example 34 were cured and tested. The wt-% of extractable unpolymerizable surfactant ranged from 78-80%.

The result that a majority, but not all, of the unpolymerizable surfactant in the samples of Examples 34 was extractable suggests that the surfactant is distributed in the coating largely in a mixture of interconnected pores and isolated pores or pockets with a majority of the surfactant in the interconnected pores. The network of interconnected pores is exposed to the surface of the film, allowing for the extraction of the surfactant. Thus the wt-% of extractable surfactant is also an approximation of the amount of surfactant present in interconnected pores. This conclusion is verified by the gas adsorption measurements and imaging data discussed below.

Gas Adsorption Measurements

The coating of Example 34 was analyzed using BET gas adsorption. The coating was isolated as follows. A 10% solution of Poly Vinyl Alcohol (PVA) was hand spread onto 5 mil DuPont Tejin PET film which was then dried in an oven at 80° C. for 12 hours. The coating solution of Example 34 was then coated onto the PVA coated PET. The coating formulation of Example 34 was then applied and cured as described previously for Example 34. The sample was then placed in a Petri dish with water overnight causing the PVA to dissolve and the cured coating to float to the surface of the water.

results. The resulting pore volume range was 0.04-0.05 cc/g and the film surface area was approximately 23-24 m$^2$/g.

The adsorption isotherm was determined using the Quantachrome Autosorb 1 Analyzer and found to have a Type H2 hysteresis loop as described in the IUPAC publication "Reporting Physisorption Data for Gas/Solid Systems with Special Reference to the Determination of Surface Area and Porosity", Pure & Applied Chemistry, Volume 57, No. 4, pp. 603-619, 1985. A Type H2 hysteresis loop is characteristic of a system of disordered pores (i.e. random special arrangement of the pores) in a network of interconnected pores with some pore blocking (i.e. necking or small diameter passages between pores that provide some resistance to flow between interconnected pores.

Imaging

Samples of Example 34 and Comparative Examples L and M were extracted in hexane. The samples were placed in a beaker with hexanes and stirred with a magnetic stirrer bar at room temperature for 24 hours. The samples were removed from the beaker and allowed to dry at room temperature.

Samples of Example 34 and Comparative Examples L and M were prepared for scanning electron microscopy (SEM) by cutting the film with a razor blade under liquid nitrogen. The cross section was attached to an SEM stub and a thin layer of AuPd was deposited to make the samples conductive. The imaging was performed using a Hitachi S-4700 field emission scanning electron microscope (available from Hitachi High Technologies America, Inc., Schaumburg, Ill.). The imaging conditions were 3.0 kV, 6 mm WD, UHR-A, freeze image capture speed, and a magnification of 80,000× was used Samples extracted with hexanes and unextracted samples were imaged. Images were taken at three positions in the cross section of the films, near the top, near the middle and near the bottom (the side closest to the PET substrate) of the cross sections.

SEM images were obtained for extracted and un-extracted samples. Extracted pores were visible in the SEM images of the extracted samples of Example 34. The morphology observed in the SEM images of the extracted films of Example 34 show distinct differences between the extracted pores and the silica nanoparticles. The extracted pores show as non-spherical void spaces within the film, and are usually dark because of their low topography within the film. The silica nanoparticles show as spheres, and are much brighter than the voids due to their high electron density and higher topography within the cross-section. The un-extracted samples of Example 34 show a rough surface from where the cross section was cut out, but there are no pores evident. The images from Comparative Examples L and M before extraction show some surface roughness from where the cross section was cut out, but significantly less roughness than present for un-extracted Example 34. The images from Comparative Examples L and M after extraction looked very similar to the images of the films before extraction and there were no pores evident in these images. These results point to the existence of an interconnected network of unpolymerizable surfactant in Example 34 that is not present in Comparative Examples L and M.

The size of the extracted pores in Example 34 was measured using calibrated images in ImageJ analysis software (a public domain, Java-based image processing program available from the National Institutes of Health). At least forty measurements were taken among two images sampled at the top, middle, and bottom of the film cross-section, respectively, to check for differences in pore size. Each measurement was tabulated into a histogram using Minitab® 15 software (available from Minitab, Inc., State College, Pa.), and fit to a normal distribution. The tabulated averages did not show a significant difference in pore size between the three different regions of the film cross-section; all tabulated averages fell within one standard deviation of the other. All measured pore sizes were aggregated into one histogram to give a mean of diameter 24 nm with a standard deviation of 8 nm.

Figure 5:
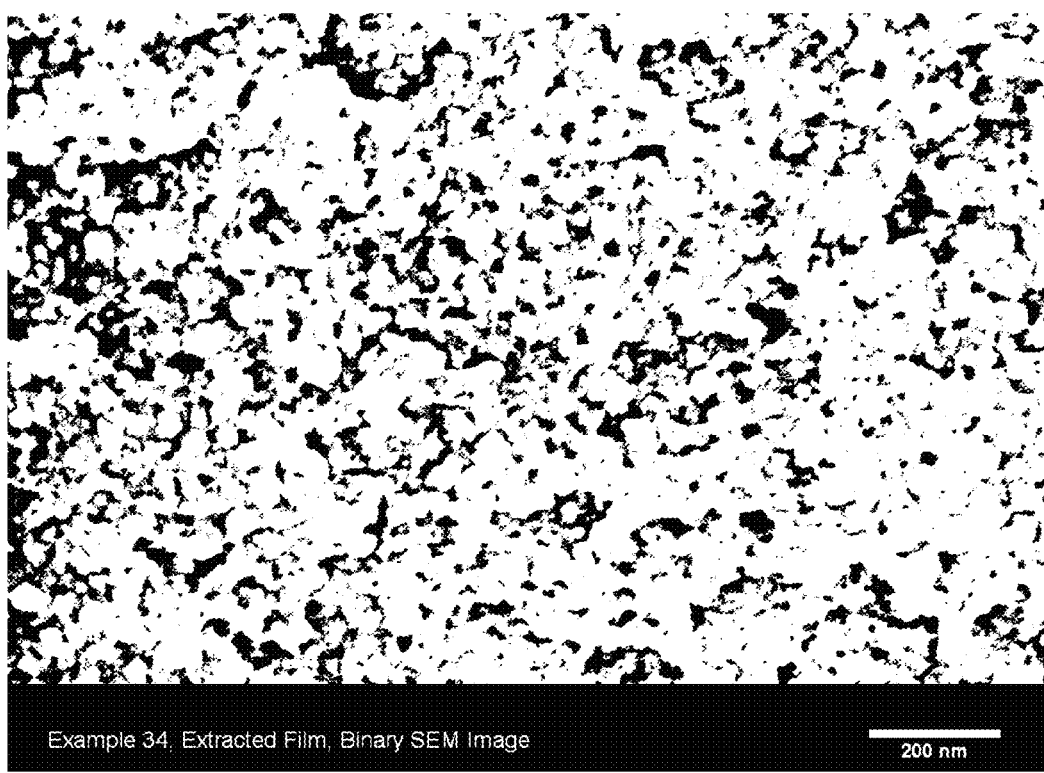
FIG. 5 is the image of FIG. 4 converted from a gray scale image to a black and white image.

An SEM image of the cross section of an extracted sample of Example 34 was converted to a binary (i.e. black and white) image using the ImageJ software. This converts all the pixels having a grayscale value of 75 or greater to white and all the pixels below a grayscale value of 75 to black. This binary image is shown in FIG. 5. The dark areas in FIG. 5 are pores and the white areas are the solid parts of the coating.

Samples of Example 34 that were extracted with hexane were prepared for transmission electron microscopy (TEM) by embedding the samples in Scotchcast™ Electrical Resin 5 (available from 3M Company, St Paul, Minn.), and microtoming at room temperature to about a 90 nm thickness. The sections were collected over water and transferred to a holey carbon support film on a 3 mm Cu TEM grid. The imaging was performed using a JEOL 2100F field emission transmission electron microscope (available from JEOL Ltd., Toyko, Japan). Images were generated from a computer-reconstructed volume of a tomogram obtained from a series of 80 bright-field TEM images obtained at 20 k× magnification and tilted at 1.5 degrees from each other. The images were acquired under computer control using the SerialEM software, and the reconstruction was performed with the eTomo software; both are available from the Boulder Laboratory for 3-D Electron Microscopy of Cells at the University of Colorado. The results were consistent with the SEM images with small pores visible having a mean of around 20 nm and a rough range of 10 to 50 nm.

What is claimed is:

1. An article comprising a cured coating wherein the cured coating is the reaction product of
   a polymerizable resin composition; and
   a non-ionic unpolymerizable surfactant optionally in combination with a polymerizable surfactant, the surfactant(s) having an hydrophilic lipophilic balance ranging from 2 to 6; wherein the total amount of the surfactant is greater than 10 wt-% and ranges up to 25 wt-% solids;
   wherein the cured coating exhibits a ratio of simulated fingerprint visibility at 20 minutes to initial simulated fingerprint visibility of less than 0.80.

2. The article of claim 1 wherein the cured coating comprise the polymerizable surfactant.

3. The article of claim 1 wherein the unpolymerizable non-ionic surfactant is a liquid at ambient temperature.

4. The article of claim 1 wherein the unpolymerizable non-ionic surfactant comprises an alkyl or alkenyl group having at least 12 carbon atoms.

5. The article of claim 1 wherein the polymerizable resin composition comprises at least one free-radically polymerizable monomer, oligomer, polymer, or mixture thereof.

6. The article of claim 5 wherein the polymerizable resin comprises at least one non-fluorinated binder precursor comprising at least two free-radically polymerizable groups.

7. The article of claim 1 wherein the cured coating further comprises inorganic oxide nanoparticles.

8. The article of claim 1 wherein the cured coating further comprises an additive comprising a silicone group, a fluorinated group, or a combination thereof.

9. The article of claim 8 wherein the additive further comprises a hydrophobic group comprising an alkyl or alkylene group having greater than 6 carbon atoms.

10. The article of claim 9 wherein the additive further comprises ethoxylate repeat units, propoxylate repeat units, or a mixture thereof bonded to the hydrophobic group.

11. The article of claim 8 wherein the additive is a free-radically polymerizable additive.

12. The article of claim 11 wherein the free-radically polymerizable additive comprises at least one (meth)acrylate group.

13. The article of claim 8 wherein the additive comprises a monovalent perfluoropolyether moiety.

14. The article of claim 13 wherein the perfluoropolyether moiety is perfluoropolyether moiety is $F(CF(CF_3)CF_2O)aCF(CF_3)$— wherein a ranges from 4 to 15.

15. The article of claim 8 wherein the fluorinated group is present in the additive at an amount no greater than about 30 mole %.

16. The article of claim 8 wherein the additive comprises urethane linkages or poly(meth)acrylate linkage.

17. The article of claim 8 wherein the additive comprises a polydimethylsiloxane backbone and at least one alkoxy side chain terminating with a (meth)acrylate group.

18. The article of claim 1 wherein the cured coating comprises a plurality of pores wherein a portion of the pores are interconnected and comprise the non-ionic unpolymerizable surfactant optionally in combination with the polymerizable surfactant.

19. The article of claim 1 wherein the article is an optical display.

20. The article of claim 1 wherein the cured coating is provided on a light transmissive polymeric film.

* * * * *